(12) United States Patent
Nakata et al.

(10) Patent No.: US 9,140,197 B2
(45) Date of Patent: Sep. 22, 2015

(54) VALVE TIMING CONTROL APPARATUS

(71) Applicant: DENSO CORPORATION, Kariya, Aichi-pref. (JP)

(72) Inventors: Shinya Nakata, Kariya (JP); Kazuhiro Sasao, Chiryu (JP); Takashi Ooga, Kariya (JP); Takehiro Tanaka, Okazaki (JP); Kosei Takagi, Nagoya (JP); Yuusuke Yasuki, Nishio (JP); Shuhei Oe, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/247,515

(22) Filed: Apr. 8, 2014

(65) Prior Publication Data

US 2014/0299081 A1 Oct. 9, 2014

(30) Foreign Application Priority Data

Apr. 9, 2013 (JP) .................................. 2013-81529

(51) Int. Cl.
*F01L 1/34* (2006.01)
*F02D 13/02* (2006.01)
*F01L 31/06* (2006.01)

(52) U.S. Cl.
CPC ................ *F02D 13/02* (2013.01); *F01L 31/06* (2013.01); *Y02T 10/18* (2013.01)

(58) Field of Classification Search
CPC .................... F01L 1/344; F01L 1/3442; F01L 2001/34459
USPC ............................................ 123/90.15–90.18
See application file for complete search history.

(56) References Cited

U.S. PATENT DOCUMENTS

| 8,844,485 | B2 * | 9/2014 | Tanaka et al. | 123/90.17 |
| 8,991,345 | B2 * | 3/2015 | Yasuki et al. | 123/90.17 |
| 2014/0366823 | A1 * | 12/2014 | Noda et al. | 123/90.15 |

FOREIGN PATENT DOCUMENTS

| JP | 2002-256910 | 9/2002 |
| JP | 4161356 | 8/2008 |

* cited by examiner

*Primary Examiner* — Thomas Denion
*Assistant Examiner* — Daniel Bernstein
(74) *Attorney, Agent, or Firm* — Nixon & Vanderhye PC

(57) ABSTRACT

A valve timing control apparatus includes a temperature sensing member which expands at a main lock phase when a temperature of an engine is higher than or equal to a predetermined temperature so as to prohibit a main lock component from moving out of a main lock hole to a guide slot. The temperature sensing member shrinks at the main lock phase when the temperature of the engine is lower than the predetermined temperature so as to allow the main lock component to move out of the main lock hole toward the guide slot.

6 Claims, 17 Drawing Sheets

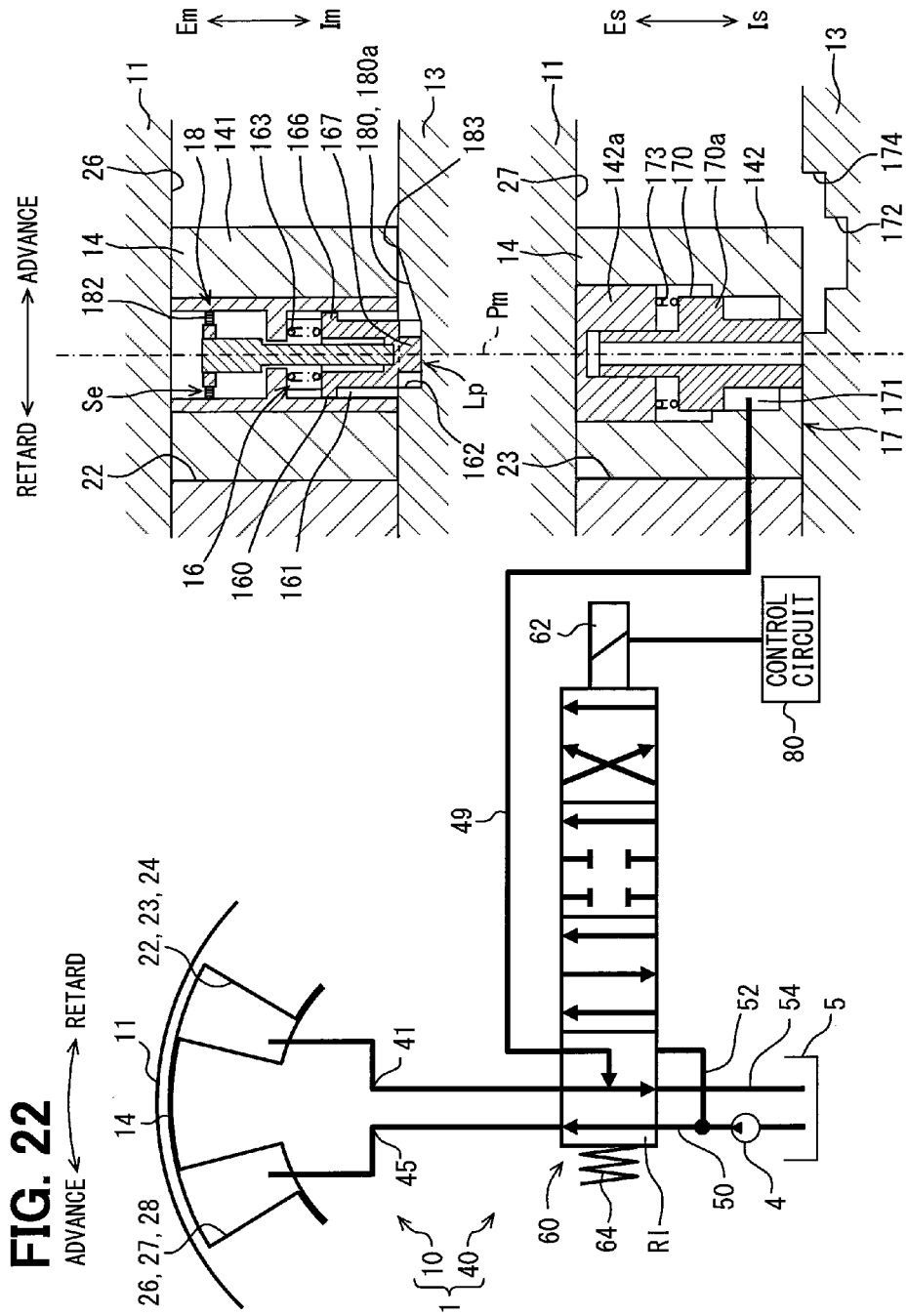

VALVE TIMING CONTROL APPARATUS

CROSS REFERENCE TO RELATED APPLICATION

This application is based on Japanese Patent Application No. 2013-81529 filed on Apr. 9, 2013, the disclosure of which is incorporated herein by reference in its entirety.

TECHNICAL FIELD

The present disclosure relates to a valve timing control apparatus.

BACKGROUND

Conventionally, a fluid pressure type valve timing control apparatus is known, which controls a valve timing of an intake valve by a pressure of hydraulic fluid. Generally, the valve timing control apparatus is equipped with a housing rotor and a vane rotor which are rotated with a crankshaft and a camshaft of an internal combustion engine, respectively. The rotation phase between the rotors is changed when the vane rotor receives the pressure of hydraulic fluid in the housing rotor. The valve timing is adjusted by the change in the rotation phase.

JP 4161356 B describes such a valve timing control apparatus, in which the rotation phase is locked at a middle phase which is on the advance side from the most retard phase when the internal combustion engine is started. In this case, the timing closing an intake valve can be made early as much as possible, so a real compression ratio in a cylinder can be made high. Therefore, the temperature of gas in the cylinder is raised by heat produced by the compression, and the fuel evaporation is promoted. For example, under low temperature environment, the engine startability can be secured after the engine is left for a long time in the stop state.

However, the high compression ratio in the cylinder may cause knocking when the internal combustion engine is started under comparatively high temperature environment such as normal temperature.

Moreover, in case where the internal combustion engine is applied to an idling stop system or a hybrid system, when the engine is restarted, pre-ignition may be generated. Also, when the engine is restarted immediately after the engine is stopped by ignition-off, pre-ignition may be generated. The pre-ignition means a self-ignition before ignition when the temperature of gas in the cylinder becomes too much high at the time of compression. Moreover, if the variation in the cranking rotation is increased by a large reaction force of the compression, unpleasant vibration or noise is generated.

JP 2002-256910 A describes a fluid pressure type valve timing control apparatus, in which the lock phase is selected between a retard phase and a middle phase at the time of starting the internal combustion engine. The retard phase is set for closing an intake valve later than a timing at which the piston in a cylinder reaches a bottom dead center. The middle phase is on the advance side from the retard phase. Such a selection makes it possible to suitably start the engine based on the temperature of the engine (hereafter may be referred to as engine temperature).

However, in JP 2002-256910 A, at the time of starting the engine under high temperature environment, the pressure of hydraulic fluid is applied to the vane rotor in the housing rotor, such that the retard phase is selected by the control in the rotation phase not by the lock of the rotation phase. Therefore, in case where the pressure of hydraulic fluid is low when the engine is started, the vane rotor is rotated on the advance side relative to the housing rotor by the variation torque applied from the camshaft, so the rotation phase is easily shifted from the retard phase.

Moreover, in JP 2002-256910 A, because the variation torque changes the rotation phase to the middle phase at the time of starting the engine under low temperature environment, the hydraulic fluid which gives pressure to the vane rotor in the housing rotor is drained. As a result, since the hydraulic fluid which gives pressure to a lock member is also drained, the lock member may move to an unlock position, so the lock at the middle phase may become difficult.

SUMMARY

According to an example of the present disclosure, a valve timing control apparatus which controls a valve timing of an intake valve opening and closing a cylinder of an internal combustion engine by a pressure of hydraulic fluid includes a housing rotor, a vane rotor, a main lock member, a secondary lock member, a lock controller. The housing rotor is rotated with a crankshaft of the internal combustion engine. The vane rotor is rotated with a camshaft of the internal combustion engine, and receives the pressure of hydraulic fluid in the housing rotor such that a rotation phase of the vane rotor relative to the housing rotor is changed. The main lock member has a main lock component and a main lock hole which are engaged with each other to lock the rotation phase at a main lock phase for closing the intake valve later than a timing at which a piston in the cylinder reaches a bottom dead center. The secondary lock member has a secondary lock component and a secondary lock hole which are engaged with each other to lock the rotation phase at a secondary lock phase which is set on an advance side than the main lock phase. The lock controller controls lock and unlock of the rotation phase by controlling the main lock member and the secondary lock member, and has a guide slot and a temperature sensing member. The guide slot guides the main lock component from the main lock hole toward a permission point at which the secondary lock component is allowed to enter the secondary lock hole at the secondary lock phase. The temperature sensing member expands at the main lock phase when a temperature of the engine is higher than or equal to a predetermined temperature so as to prohibit the main lock component from moving out of the main lock hole toward the guide slot. The temperature sensing member shrinks at the main lock phase when the temperature of the engine is lower than the predetermined temperature so as to allow the main lock component to move out of the main lock hole toward the guide slot.

Accordingly, when the temperature of the engine is higher than or equal to the predetermined temperature in the state where the engine is stopped, at the main lock phase, the temperature sensing member expands such that the main lock component is prohibited from moving out of the main lock hole toward the guide slot. As a result, the main lock component stays at the main lock hole, and the rotation phase maintains to be locked at the main lock phase. At the main lock phase, the intake valve is closed later timing later than the timing at which the piston in the cylinder reaches the bottom dead center, therefore, at the next start of the engine, gas in the cylinder is pushed out to the intake system by the lift-up of the piston after reaching the bottom dead center. Thus, a real compression ratio is lowered. Accordingly, when the temperature of the engine is higher than or equal to the predetermined temperature and when the engine is started, the rotation phase is maintained to be locked at the main lock phase, so starting fault such as knocking, pre-ignition and unpleasant vibration or noise can be controlled.

On the other hand, when the temperature of the engine is lower than the predetermined temperature in the state where the engine is stopped, at the main lock phase, the rotation phase is unlocked by the temperature sensing member because the main lock component is allowed to move. Therefore, at the next start of the engine, the main lock component is guided toward the permission point from the main lock hole to the guide slot by the variation torque applied from the camshaft, and the vane rotor is rotated on the advance side relative to the housing rotor. As a result, when the rotation phase is changed to the secondary lock phase which is set on the advance side than the main lock phase, the secondary lock component is allowed to fit to the secondary lock hole, and the rotation phase is locked at the secondary lock phase. Therefore, the timing at which the intake valve is closed can be made early as much as possible. Thus, the push-out amount of the gas in the cylinder decreases, and the temperature of the gas is raised with the real compression ratio. Accordingly, the ignitionability is raised to secure the startablity even if the temperature of the engine is low when the engine is started.

Accordingly, it becomes possible to realize the engine start suitable for the engine temperature.

For example, the main lock component is able to rotate in a circumferential direction of the main lock hole between a prohibition position where the main lock component is prohibited from moving out at the main lock phase and an allowance position where the main lock component is allowed to move out at the main lock phase. The temperature sensing member is changed based on the temperature of the engine between an expanding state in which the main lock component is driven to rotate to the prohibition position and a shrinking state in which the main lock component is driven to rotate to the allowance position.

Accordingly, when the temperature of the engine is higher than or equal to the predetermined temperature in the state where the engine is stopped, at the main lock phase, the main lock component is rotated to the prohibition position in the circumferential direction of the main lock hole, and is prohibited from moving toward the guide slot by the expanding of the temperature sensing member. In this way, the rotation phase is maintained to be locked at the main lock phase, and the starting fault may be controlled.

On the other hand, when the temperature of the engine is lower than the predetermined temperature in the state where the engine is stopped, at the main lock phase, the lock component is rotated to the allowance position in the circumferential direction of the main lock hole, and is allowed to move to the guide slot by the shrinking of the temperature sensing member. In this way, the rotation phase is changed by the variation torque to the secondary lock phase, so the startability may be secured.

Accordingly, the rotation phase can be suitably changed by the expanding and the shrinking of the temperature sensing member based on the temperature of the engine and the rotation of the main lock component.

For example, the guide slot is defined at a predetermined position of the main lock hole in the circumferential direction. The main lock component has a slide part which rotatably enters the main lock hole at the main lock phase and which slides into the guide slot at the rotation phase from the main lock phase to the secondary lock phase. The prohibition position is a rotation position where the slide part is deviated from an opening of the main lock hole corresponding to the guide slot in the circumferential direction of the main lock hole. The allowance position is a rotation position where the slide part is able to enter the opening of the main lock hole corresponding to the guide slot.

Accordingly, the slide part of the main lock component entering the main lock hole at the main lock phase when the temperature of the engine is high while the engine is in the stopped condition is rotated to the prohibition position by the temperature sensing member in the expanding state, thereby producing a circumferential deviation relative to the opening corresponding to the guide slot at a predetermined position in the circumferential direction. Therefore, the slide part is certainly prohibited from moving out of the main lock hole toward the guide slot, and the rotation phase can be maintained to be locked at the main lock phase.

On the other hand, the slide part entering the main lock hole at the main lock phase at the main lock phase when the temperature of the engine is low while the engine is in the stopped condition is rotated to the allowance position by the temperature sensing member in the shrinking state, thereby opposing the guide slot to be able to enter the opening. Therefore, the slide part is certainly allowed to move out of the main lock hole to the guide slot, and the rotation phase can be unlocked from the main lock phase.

Furthermore, when the rotation phase is changed to the secondary lock phase while the temperature of the engine is low under the situation where the engine is in the stopped condition, the slide part slides in the guide slot, therefore, the main lock component can be certainly guided to the permission point, and the secondary lock component is made to enter the secondary lock hole. Thus, the rotation phase is correctly and accurately locked or unlocked based on the engine temperature, and it becomes possible to improve the reliability about the change in the rotation phase suitably based on the temperature of the engine in the stopped state.

BRIEF DESCRIPTION OF THE DRAWINGS

The above and other objects, features and advantages of the present disclosure will become more apparent from the following detailed description made with reference to the accompanying drawings. In the drawings:

FIG. 22 is a modification example of FIG. 5.

DETAILED DESCRIPTION

An embodiment of the present disclosure is described based on the drawings.

Figure 1:
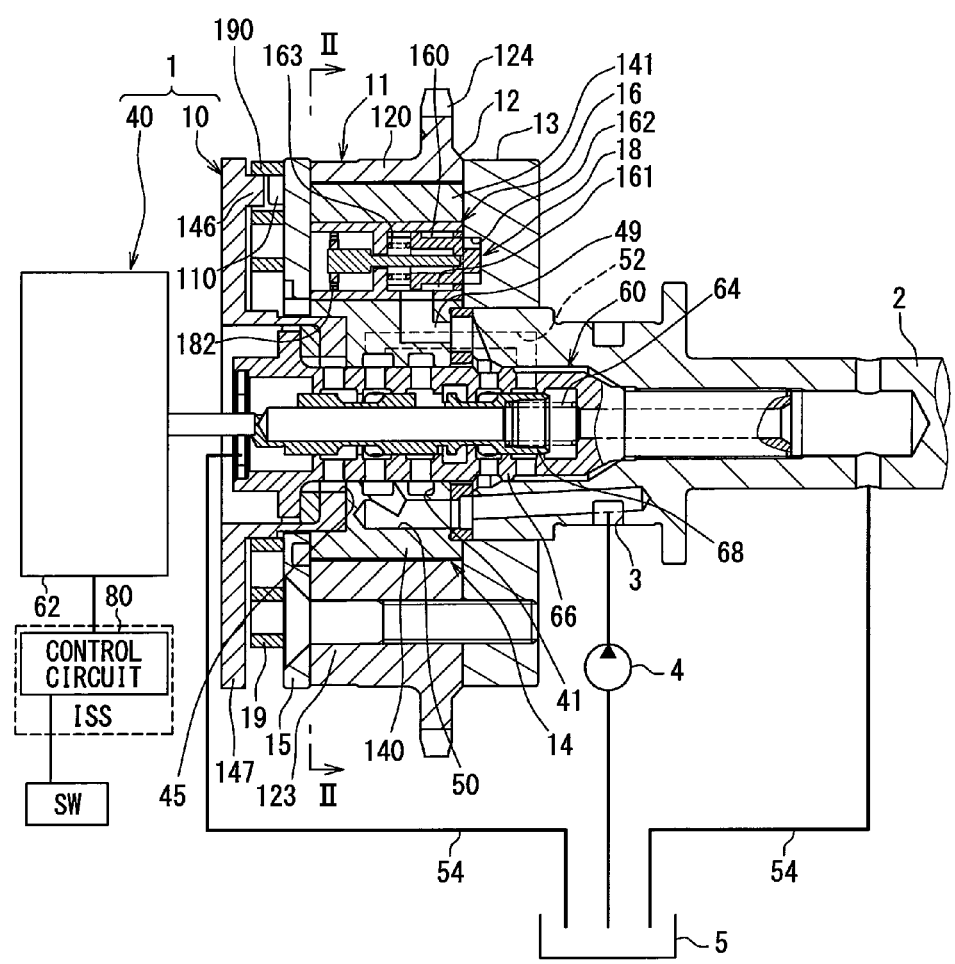
FIG. 1 is a schematic cross-sectional view illustrating a valve timing control apparatus according to a first embodiment, taken along a line I-I of FIG. 2.

As shown in FIG. 1, a valve timing control apparatus 1 according to the embodiment is mounted to an internal combustion engine of a vehicle. In this embodiment, the engine is stopped and started not only by OFF instruction and ON instruction of an engine switch SW, respectively, but also by idling stop instruction and re-starting instruction of an idling stop (reduction) system ISS.

The valve timing control apparatus 1 is a fluid pressure type which uses a pressure of operation oil (hydraulic fluid), and adjusts a valve timing of an intake valve 9 (see FIG. 15) which is opened or closed by a camshaft 2 by transmitting the engine torque. As shown in FIGS. 1-8, the valve timing control apparatus 1 is equipped with a drive part 10 and a control part 40. The drive part 10 is arranged in a transfer system which transmits the engine torque outputted from a crankshaft (not shown) of the engine to the camshaft 2. The control part 40 controls a flow of the operation oil to drive the drive part 10.

Figure 2:
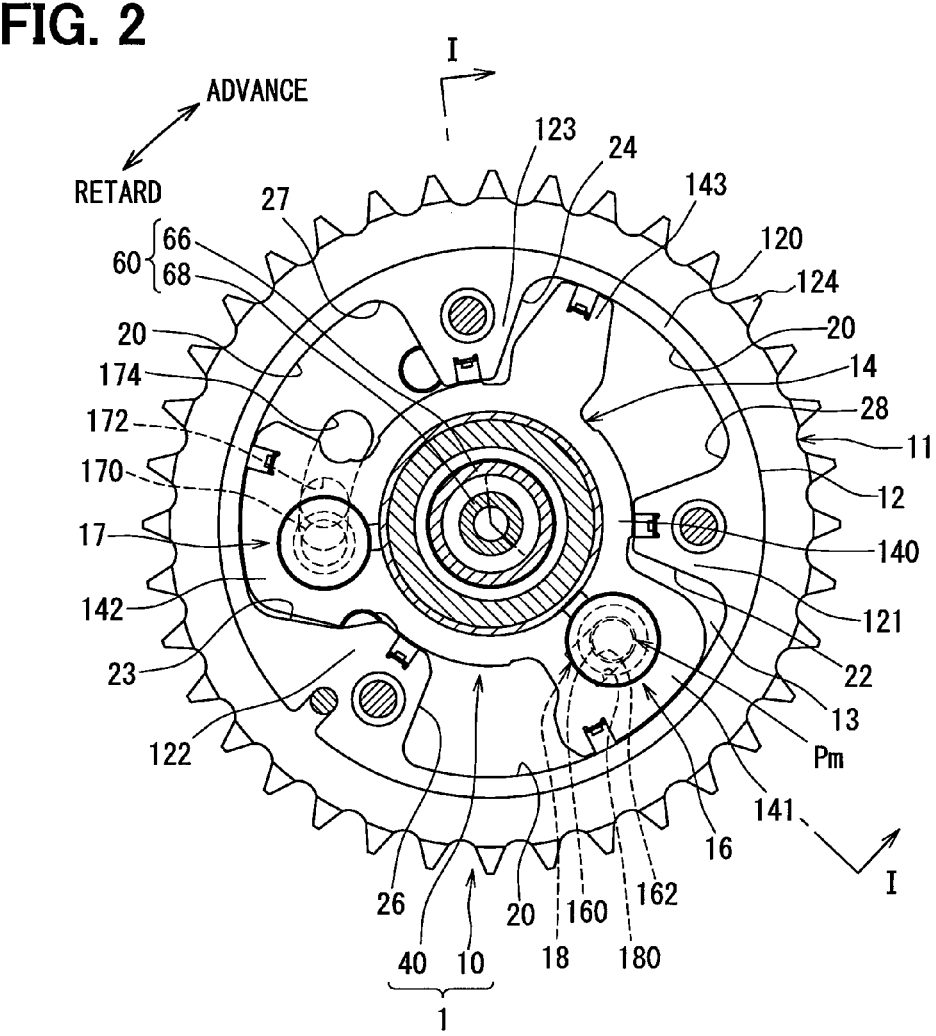
FIG. 2 is a cross-sectional view taken along a line II-II of FIG. 1.

As shown in FIGS. 1 and 2, the drive part 10 has a housing rotor 11 made of metal, in which a rear plate 13 and a front plate 15 are tightened to the axial ends of a shoe ring 12, respectively. The rear plate 13 has lock holes 162, 172 opposing to the shoe ring 12.

The shoe ring 12 has a cylindrical main housing 120, multiple shoes 121, 122, 123, and a sprocket 124. As shown in FIG. 2, the shoes 121, 122, 123 are arranged in the rotational direction with a predetermined interval, and are projected inward in the radial direction from the main housing 120. An accommodation chamber 20 is defined between the shoes 121, 122, 123 adjacent with each other. The sprocket 124 is connected to the crankshaft through a timing chain (not shown). While the engine is rotated, the engine torque is transmitted to the sprocket 124 from the crankshaft, such that the housing rotor 11 is rotated with the crankshaft in a predetermined direction (clockwise in FIG. 2).

As shown in FIGS. 1 and 2, a vane rotor 14 made of metal is coaxially accommodated in the housing rotor 11. The axial ends of the vane rotor 14 are slidingly moved on the rear plate 13 and the front plate 15, respectively. The vane rotor 14 has a cylindrical rotation shaft 140 and multiple vanes 141, 142, 143. The rotation shaft 140 is coaxially fixed to the camshaft 2. The vane rotor 14 is rotated with the camshaft 2 in the same direction as the housing rotor 11 (clockwise in FIG. 2), and is able to be rotated relative to the housing rotor 11.

As shown in FIG. 2, the vanes 141, 142, 143 are arranged in the rotational direction with a predetermined interval, and are projected outward in the radial direction from the rotation shaft 140 so as to be accommodated in the corresponding accommodation chambers 20, respectively. The vane 141, 142, 143 divides the corresponding accommodation chamber 20 into two spaces in the rotation direction, such that advance chambers 22, 23, 24 and retard chambers 26, 27, 28 are defined in the housing rotor 11 for the operation oil. Specifically, the advance chamber 22 is formed between the shoe 121 and the vane 141, the advance chamber 23 is formed between the shoe 122 and the vane 142, and the advance chamber 24 is formed between the shoe 123 and the vane 143. The retard chamber 26 is formed between the shoe 122 and the vane 141, the retard chamber 27 is formed between the shoe 123 and the vane 142, and the retard chamber 28 is formed between the shoe 121 and the vane 143.

Figure 5:
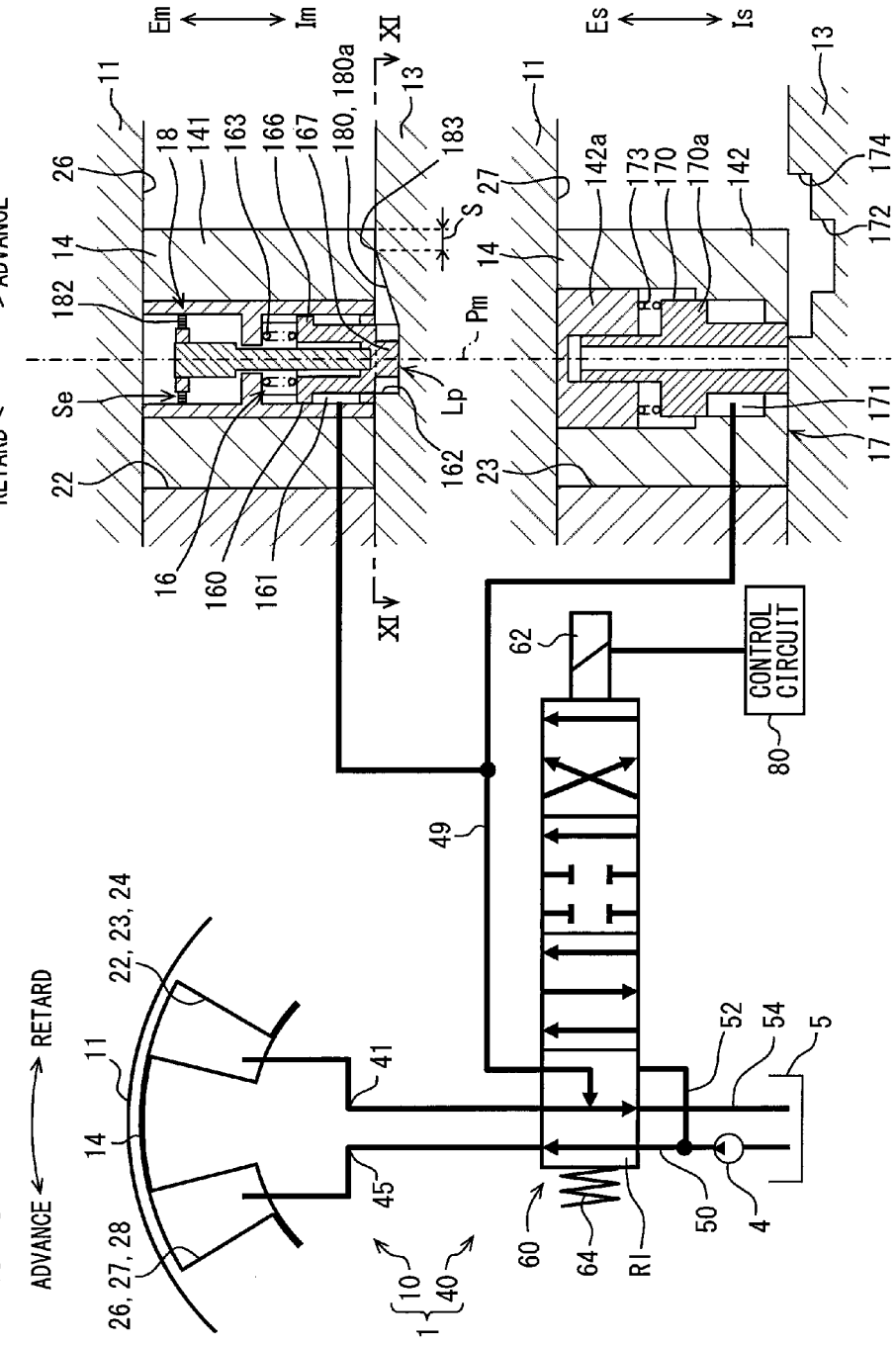
FIG. 5 is a diagram showing an operation state of the valve timing control apparatus of FIG. 1.
Figure 7:
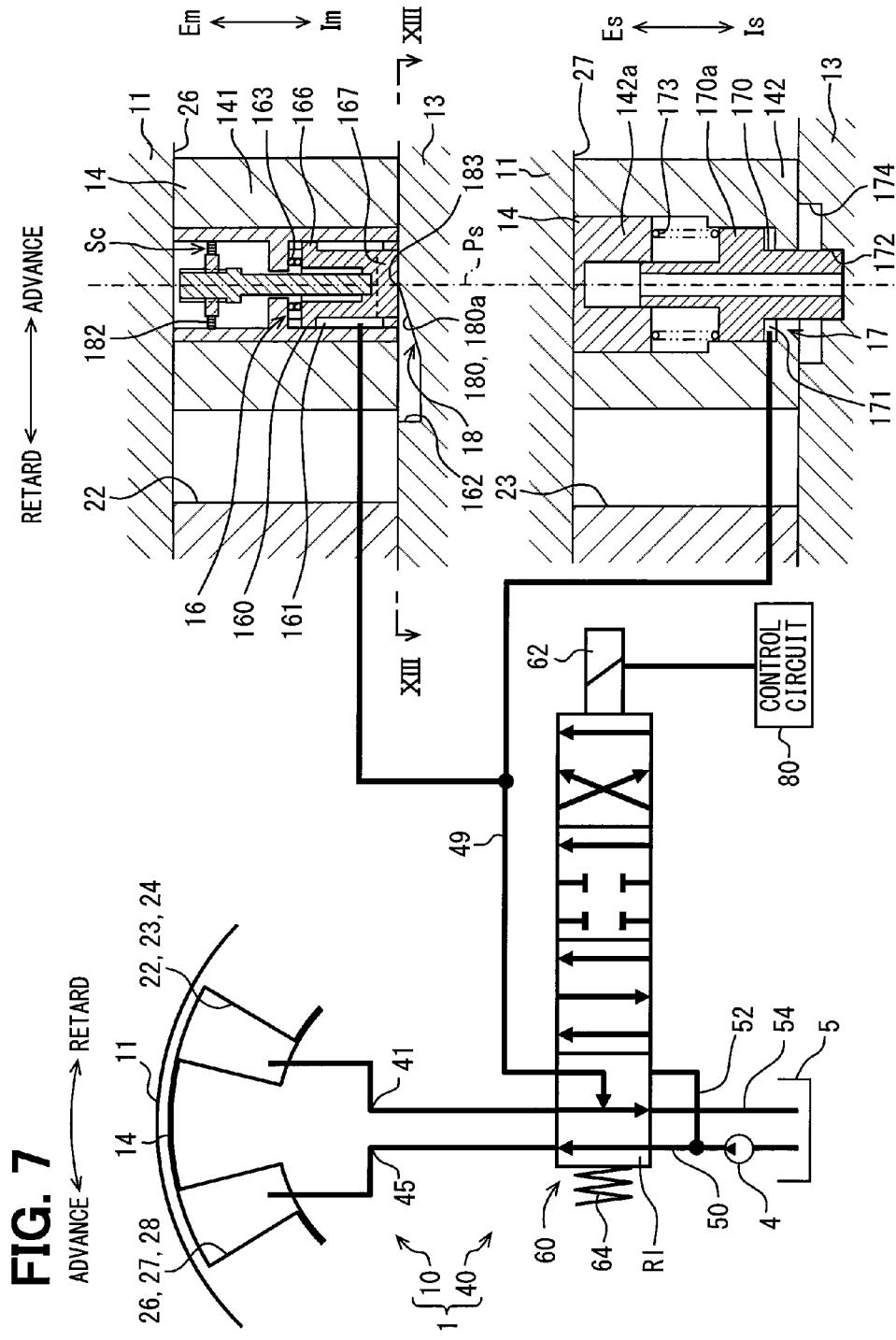
FIG. 7 is a diagram showing an operation state of the valve timing control apparatus of FIG. 1.
Figure 8:
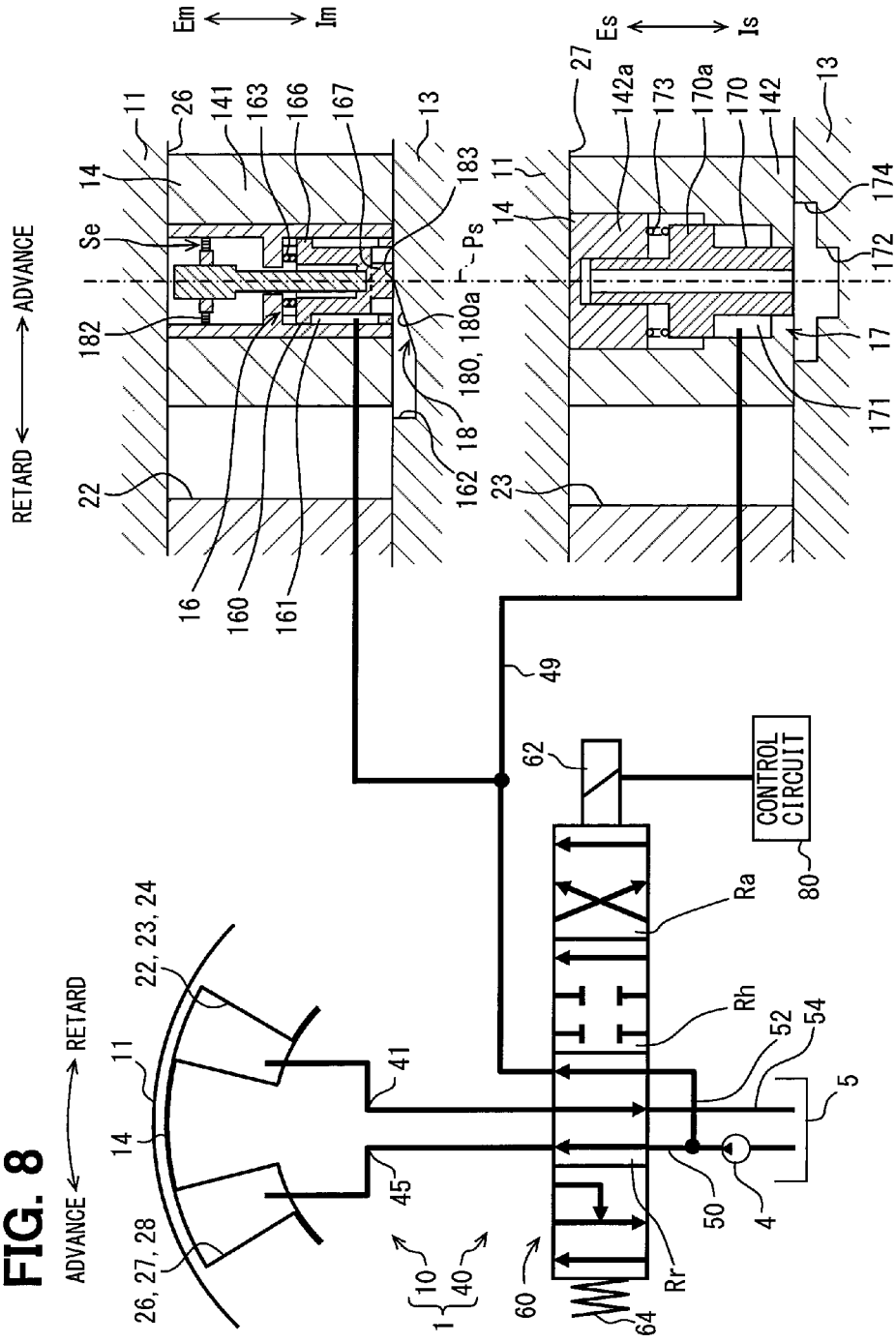
FIG. 8 is a diagram showing an operation state of the valve timing control apparatus of FIG. 1.

As shown in FIGS. 1 and 2, the vane 141 supports a main lock component 160 made of metal in a state where the main lock component 160 is able to reciprocate in the axial direction at an eccentric position relative to the rotation shaft 140. The vane 141 has an annular main unlock chamber 161 around the main lock component 160 for the operation oil. As shown in FIGS. 1 and 5, when the operation oil is discharged from the main unlock chamber 161, the main lock component 160 moves and fits to the main lock hole 162. The main lock component 160 locks a rotation phase of the vane rotor 14 relative to the housing rotor 11 (hereafter may be just referred to the rotation phase) at a main lock phase Pm. In contrast, as shown in FIGS. 7 and 8, the main lock component 160 moves out of the main lock hole 162 by receiving the pressure of the operation oil introduced into the main unlock chamber 161. Thus, the main lock component 160 unlocks the rotation phase from the main lock phase Pm.

Figure 3:
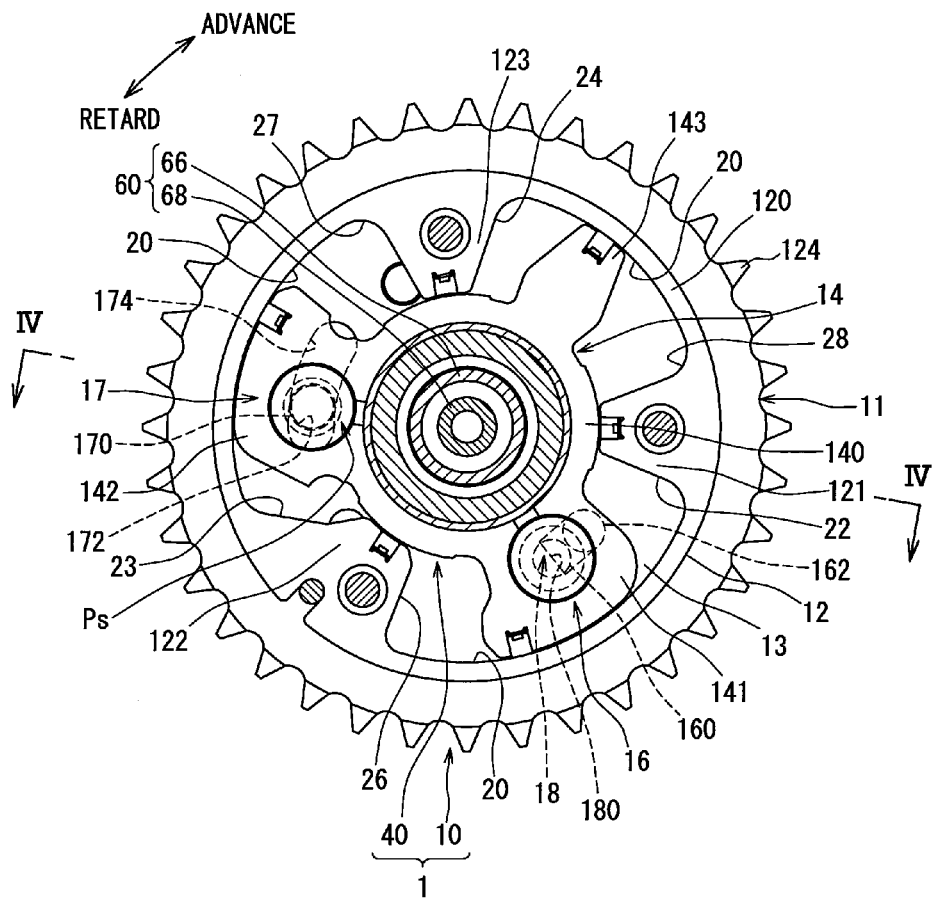
FIG. 3 is a cross-sectional view illustrating an operation state different from FIG. 2.
Figure 4:
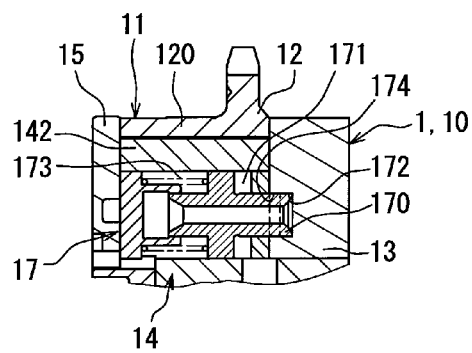
FIG. 4 is a cross-sectional view taken along a line IV-IV of FIG. 3.

As shown in FIGS. 3 and 4, the vane 142 supports a secondary lock component 170 made of metal in a state where the secondary lock component 170 is able to reciprocate in the axial direction at an eccentric position relative to the rotation shaft 140. The vane 142 has an annular secondary unlock chamber 171 around the secondary lock component 170 for the operation oil. As shown in FIGS. 4 and 7, when the operation oil is discharged from the secondary unlock chamber 171, the secondary lock component 170 moves and fits to the secondary lock hole 172. Thus, the secondary lock component 170 locks the rotation phase at a secondary lock phase Ps. In contrast, as shown in FIG. 8, the secondary lock component 170 moves out of the secondary lock hole 172 by receiving the pressure of the operation oil introduced into the secondary unlock chamber 171. Thus, the secondary lock component 170 unlocks the rotation phase from the secondary lock phase Ps.

In the drive part 10, under the situation where the rotation phase is unlocked, the vane rotor 14 receives the pressure of the operation oil flowing into or from the advance chambers 22, 23, 24 and the retard chambers 26, 27, 28 in the housing rotor 11, such that the valve timing is adjusted. Specifically, when the operation oil is introduced to the advance chambers 22, 23, 24 and when the operation oil is discharged from the retard chambers 26, 27, 28, the rotation phase changes to the advance side (for example, from FIG. 2 to FIG. 3). As a result, the valve timing is advanced.

When the operation oil is introduced to the retard chambers 26, 27, 28 and when the operation oil is discharged from the advance chambers 22, 23, 24, the rotation phase changes to the retard side (for example, from FIG. 3 to FIG. 2). As a result, the valve timing is retarded. When the operation oil stays in the advance chambers 22, 23, 24 and the retard chambers 26, 27, 28, the rotation phase is restricted from changing, and the valve timing is approximately maintained.

In the control part 40, as shown in FIGS. 1 and 5, a main advance passage 41 is defined in the rotation shaft 140, and communicates to the advance chambers 22, 23, 24. A main retard passage 45 is defined in the rotation shaft 140, and communicates to the retard chambers 26, 27, 28. An unlock passage 49 is defined in the rotation shaft 140, and communicates to both of the unlock chambers 161, 171.

A main supply passage 50 is defined in the rotation shaft 140, and communicates to a pump 4 corresponding to a supply source through a conveyance passage 3. The pump 4 is a mechanical type driven by receiving the engine torque while the engine is rotated, and continues discharging the operation oil taken from a drain pan 5 during the rotation of the engine. The conveyance passage 3 passing through the camshaft 2 and the bearing is always able to communicate with the discharge port of the pump 4 irrespective of the rotation of the camshaft 2. When the engine is cranked to start and perfect ignition, the supply of operation oil to the main supply passage 50 is started. The supply of operation oil is stopped when the engine stops.

A sub supply passage 52 is defined in the rotation shaft 140, and is branched from the main supply passage 50. The sub supply passage 52 receives the operation oil supplied from the pump 4 through the main supply passage 50. A drain recovering passage 54 is defined outside the drive part 10 and the camshaft 2. The drain recovering passage 54 is defined outside atmosphere with the drain pan 5 as a drain recovering section, and is able to discharge the operation oil to the drain pan 5.

A control valve 60 is a spool valve, and uses the driving force generated by a linear solenoid 62 and the restoring force of a biasing component 64 which is generated in the opposite direction opposite from the driving force. The control valve 60 is connected with each of the passages 41, 45, 49, 50, 52, 54, and makes a spool 68 to reciprocate in a sleeve 66 in the axial direction, as shown in FIGS. 1 and 2, thereby changing the communication or interception state between the passages. Specifically, when the spool 68 moves to a lock domain Rl shown in FIGS. 5-7, the operation oil is introduced from the pump 4 into the retard chambers 26, 27, 28, and the operation oil is discharged from the advance chambers 22, 23, 24 and the unlock chamber 161, 171 to the drain pan 5.

When the spool 68 moves to a retard domain Rr shown in FIG. 8, the operation oil is discharged from the advance chambers 22, 23, 24 to the drain pan 5, and the operation oil is introduced from the pump 4 into the retard chambers 26, 27, 28 and the unlock chamber 161, 171. When the spool 68 moves to an advance domain Ra shown in FIG. 8, the operation oil is discharged from the retard chambers 26, 27, 28 to the drain pan 5, and the operation oil is introduced from the pump 4 into the advance chambers 22, 23, 24 and the unlock chamber 161, 171. When the spool 68 moves to a hold domain Rh shown in FIG. 8, the operation oil is introduced from the pump 4 into the unlock chamber 161, 171, and the operation oil stays in the advance chambers 22, 23, 24 and the retard chambers 26, 27, 28.

A control circuit 80 is a microcomputer electrically connected with the linear solenoid 62, the engine switch SW and the various electronic parts of the engine, so as to construct the idling stop system ISS. The control circuit 80 controls the energization of the linear solenoid 62 and the operation of the engine including the idol stop according to a computer program.

A main lock mechanism 16 corresponding to a main lock member is described. As shown in FIGS. 1, 2, 9, and 10, the main lock mechanism 16 is defined by combining a main elastic component 163 to the group of the main lock elements 160, 161, 162.

Figure 9:
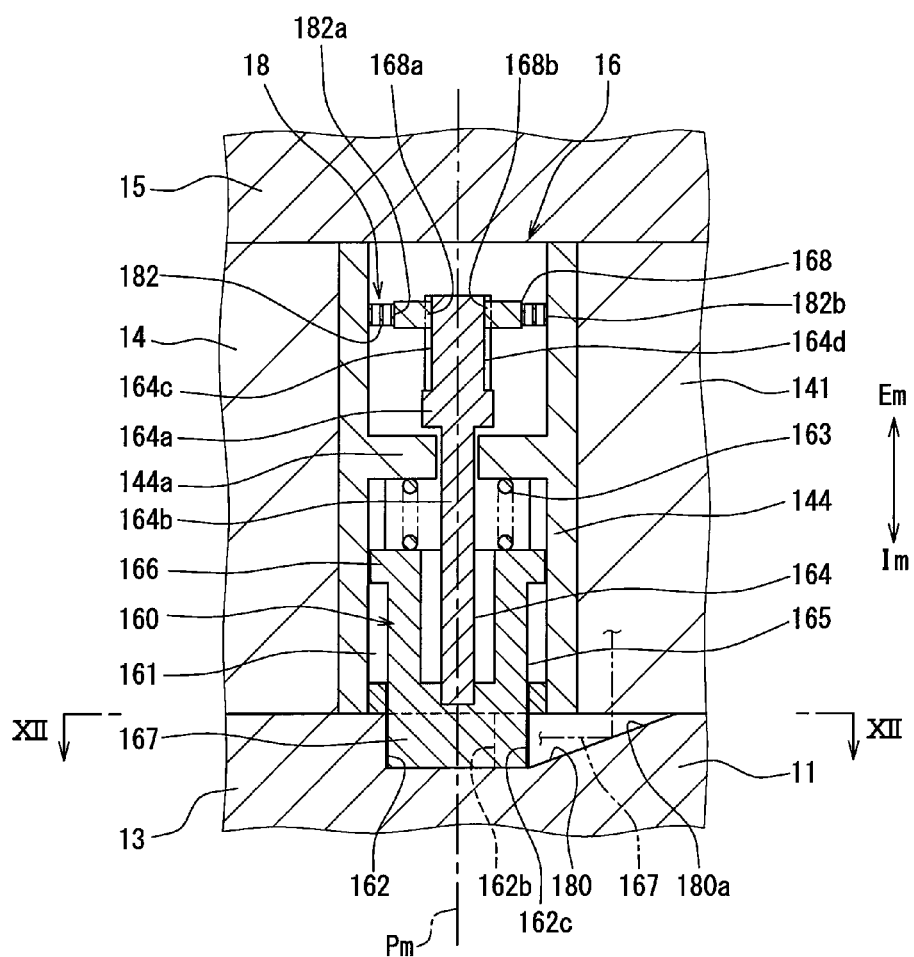
FIG. 9 is an enlarge view illustrating a part of the valve timing control apparatus of FIG. 1.
Figure 12:
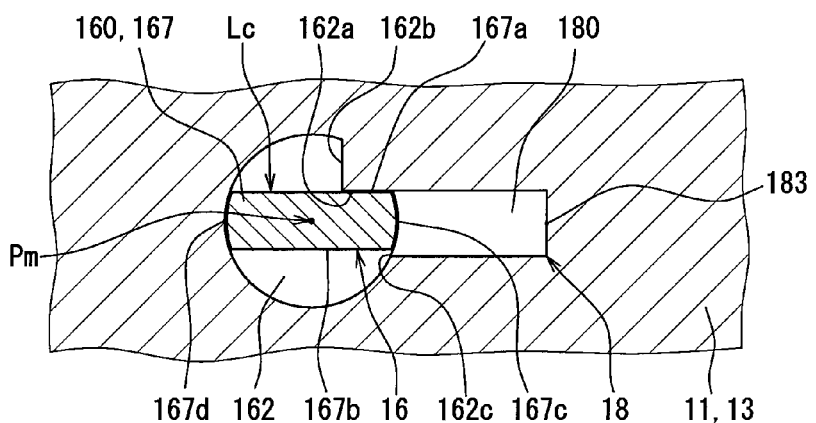
FIG. 12 is a cross-sectional view taken along a line XII-XII of FIGS. 6 and 9.

As shown in FIGS. 9 and 12, the main lock hole 162 defined in the rear plate 13 to have a based (blind) cylindrical hole has a prohibition stopper 162b, an allowance stopper 162a, and an opening 162c arranged in this order in the circumferential direction. The allowance stopper 162a and the prohibition stopper 162b have plane shapes approximately perpendicular to each other, in other words, the stoppers 162a, 162b face in the opposite direction from each other in the circumferential direction of the main lock hole 162. The opening 162c has a predetermined dimension at a specific position adjacent to the allowance stopper 162a, that is opposite from the prohibition stopper 162b in the circumferential direction of the main lock hole 162. The opening 162c corresponds to an opening of a guide slot 180 to be explained later. The guide slot 180 may be referred as a guide groove.

Figure 10:
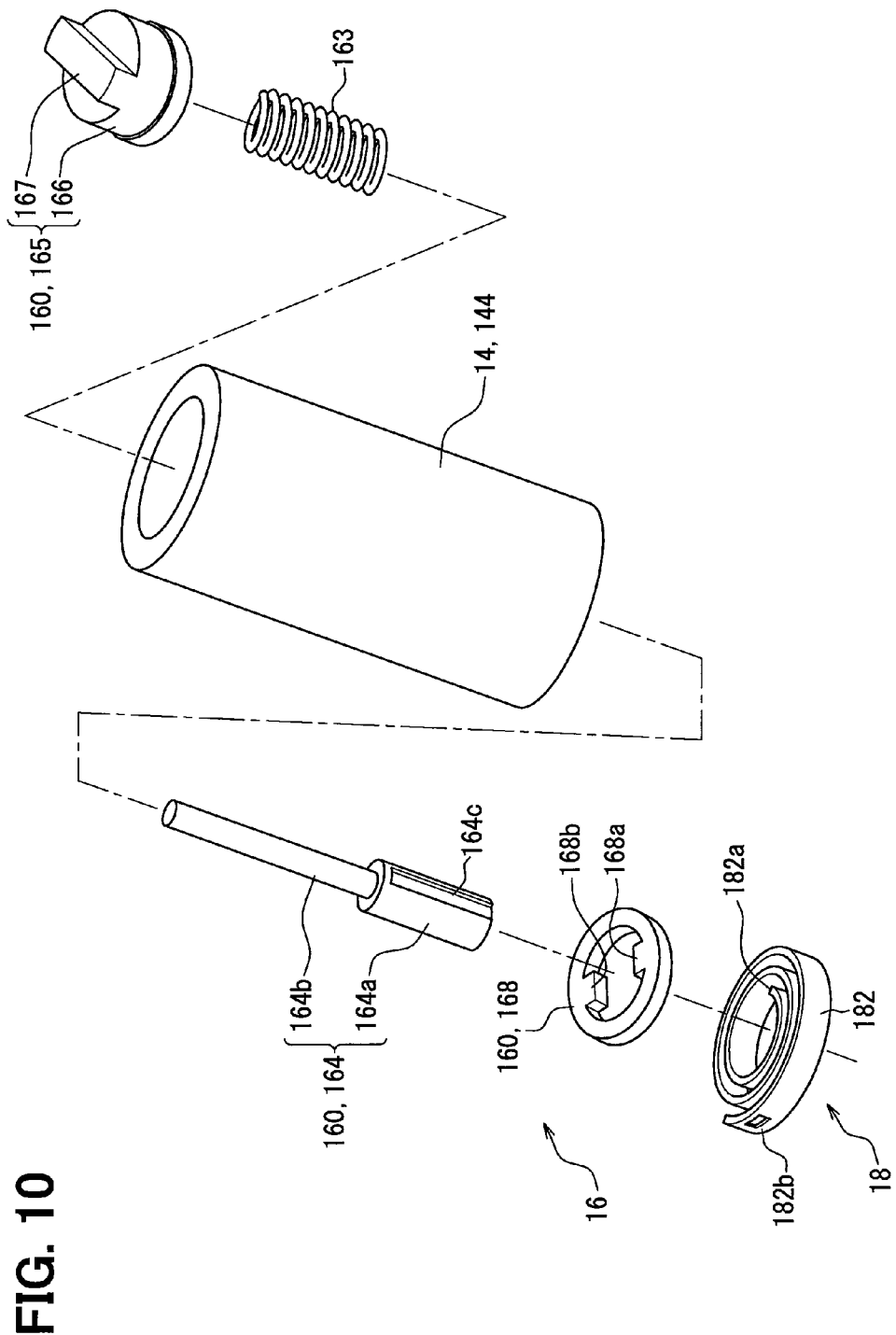
FIG. 10 is an exploded perspective view illustrating the valve timing control apparatus of FIG. 1.

As shown in FIGS. 9 and 10, the main lock component 160 is inserted into a cylindrical support bush 144 disposed in the vane 141 of the vane rotor 14 in the integrally rotatable state. The main lock component 160 coaxially has a shaft 164, a plunger 165, and a fitting ring 168 relative to the support bush 144.

The shaft 164 has a large diameter part 164a and a small diameter part 164b. A diameter of the large diameter part 164a is larger than that of the small diameter part 164b. The small diameter part 164b is projected from the large diameter part 164a. As shown in FIG. 9, the support bush 144 has an inner flange part 144a at the intermediate position in the axial direction, and the large diameter part 164a is located between the inner flange part 144a and the front plate 15. The large diameter part 164a is able to reciprocate in the axial direction and is able to rotate in the circumferential direction, in the support bush 144. The small diameter part 164b passes through a main hole of the inner flange part 144a, that is, extends from a side of the front plate 15 through the flange part 144a to a side of the rear plate 13. The small diameter part 164b is projected toward the rear plate 13 from the large diameter part 164a, and is able to reciprocate and rotate integrally with the large diameter part 164a.

As shown in FIGS. 9 and 10, the plunger 165 includes a cylindrical slide part 166 and a plate slide part 167. The cylindrical slide part 166 has a cylindrical shape with a base. The plate slide part 167 is projected from the base of the cylindrical slide part 166 in the axial direction. As shown in FIG. 9, the cylindrical slide part 166 is located between the inner flange part 144a and the rear plate 13, and is able to reciprocate in the axial direction and is able to rotate in the circumferential direction, in the support bush 144. An end part of the small diameter part 164b of the shaft 164 is fittingly fixed to the base of the cylindrical slide part 166.

The cylindrical slide part 166 is slidingly supported by the inner circumference part of the support bush 144, and is guided with the shaft 164 in the axial direction. The cylindrical slide part 166 is exposed to the main unlock chamber 161, and receives the pressure from the unlock chamber 161. At the main lock phase Pm shown in FIGS. 5 and 6, the cylindrical slide part 166 is coaxially arranged as the main lock hole 162, and is defined to have an axial direction, a radial direction, and a circumferential direction in common with the main lock hole 162. At the main lock phase Pm, in this embodiment, the cylindrical slide part 166 does not enter the main lock hole 162 at a position in the axial direction.

As shown in FIG. 9, the plate slide part 167 is projected toward the rear plate 13 from the cylindrical slide part 166 in the support bush 144, thereby, is able to reciprocate and rotate integrally with the cylindrical slide part 166. As shown in FIG. 12, the plate slide part 167 has a pair of long surfaces 167a, 167b and a pair of short surfaces 167c, 167d to define a width-across-flat portion. The pair of long surfaces 167a, 167b defines a width portion of the plate slid part 167, which is able to enter the opening 162c. The long surface 167a, 167b spreads with a plane shape parallel along with the axial direction and the radial direction of the cylindrical slide part 166. The short surface 167c, 167d connects the edges of the long surfaces 167a, 167b with each other in the curved shape.

Figure 11:
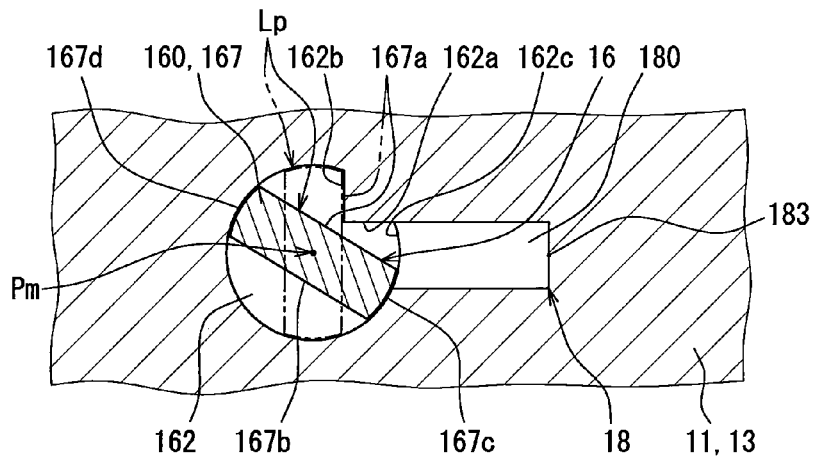
FIG. 11 is a cross-sectional view taken along a line XI-XI of FIG. 5.

At the main lock phase Pm shown in FIGS. 5, 6, 11, and 12, the plate slide part 167 is able to rotate in the circumferential direction of the main lock hole 162 between an allowance position Lc shown in FIG. 12 and a prohibition positions Lp shown in FIG. 11 in the state where the plate slide part 167 is located in the main lock hole 162. Specifically, at the allowance position Lc shown in FIG. 12, the short surface 167c of the plate slide part 167 opposes to enter the opening 162c, and the long surface 167a is in contact with the allowance stopper 162a.

At the prohibition position Lp shown in FIG. 11, the short surface 167c of the plate slide part 167 is deviated in the circumferential direction relative to the opening 162c, and both the short surfaces 167c, 167d are fitted to the inner circumference part of the main lock hole 162 between the opening 162c and the prohibition stopper 162b.

In this embodiment, the prohibition position Lp is set in a range of about ¾ of the circumference. In other words, the prohibition position Lp extends in the circumferential direction (clockwise in FIG. 11) from the allowance position Lc to a position at which the long surface 167a is in contact with the prohibition stopper 162b (as shown in a double chain line of FIG. 11). Thus, at the prohibition position Lp, the plate slide part 167 is prohibited from entering the opening 162c, so the plate slide part 167 cannot move out of the main lock hole 162 into the guide slot 180. In contrast, at the allowance position Lc, the plate slide part 167 is able to move out of the main lock hole 162 into the guide slot 180.

As shown in FIG. 9, the fitting ring 168 is arranged to surround the large diameter part 164a, and is located between the front plate 15 and the inner flange part 144a. The fitting ring 168 is able to rotate in the circumferential direction under the situation where the axial movement is regulated by the temperature sensing member 182 in the support bush 144. As shown in FIGS. 9 and 10, the fitting ring 168 integrally has a pair of fitting projections 168a, 168b projected inward in the radial direction, on the inner circumference part. The outer circumference part of the large diameter part 164a has slide grooves 164c, 164d extended in the axial direction. The fitting projections 168a, 168b are slidingly fitted to the slide grooves 164c, 164d, respectively. Therefore, the fitting ring 168 allows the plunger 165 and the shaft 164 to reciprocate and is rotated integrally with the plunger 165 and the shaft 164.

As shown in FIG. 9, the main elastic component 163 is a metal coil spring, and is accommodated in the vane 141. The main elastic component 163 is interposed between the cylindrical slide part 166 and the inner flange part 144a in the axial direction. The main elastic component 163 generates restoring force biasing the main lock component 160 toward the rear plate 13 at a rotation position in the circumferential direction. Therefore, in the rotation phase from the main lock phase Pm to the secondary lock phase Ps, as shown in FIGS. 5-8, the main lock component 160 receives the restoring force of the main elastic component 163 in an entering direction Im toward the main lock hole 162 or the guide slot 180, thus, the main lock component 160 is biased in the entering direction Im. Moreover, due to the pressure from the main unlock chamber 161 to the cylindrical slide part 166, the main lock component 160 receives the driving force in an escaping direction Em opposite from the entering direction Im against the restoring force of the main elastic component 163, thus, the main lock component 160 is driven in the escaping direction Em, as shown in FIG. 8.

Figure 14:
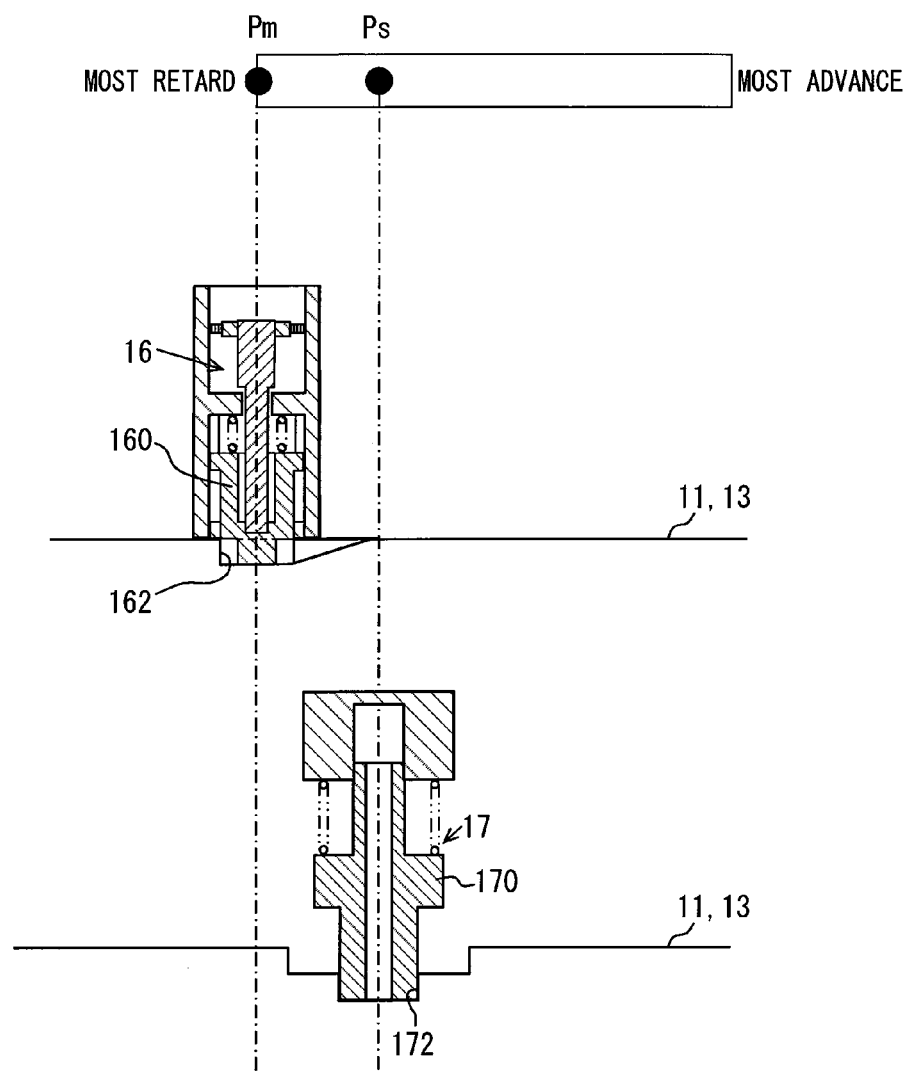
FIG. 14 is a diagram for explaining a feature of the valve timing control apparatus of FIG. 1.
Figure 15:
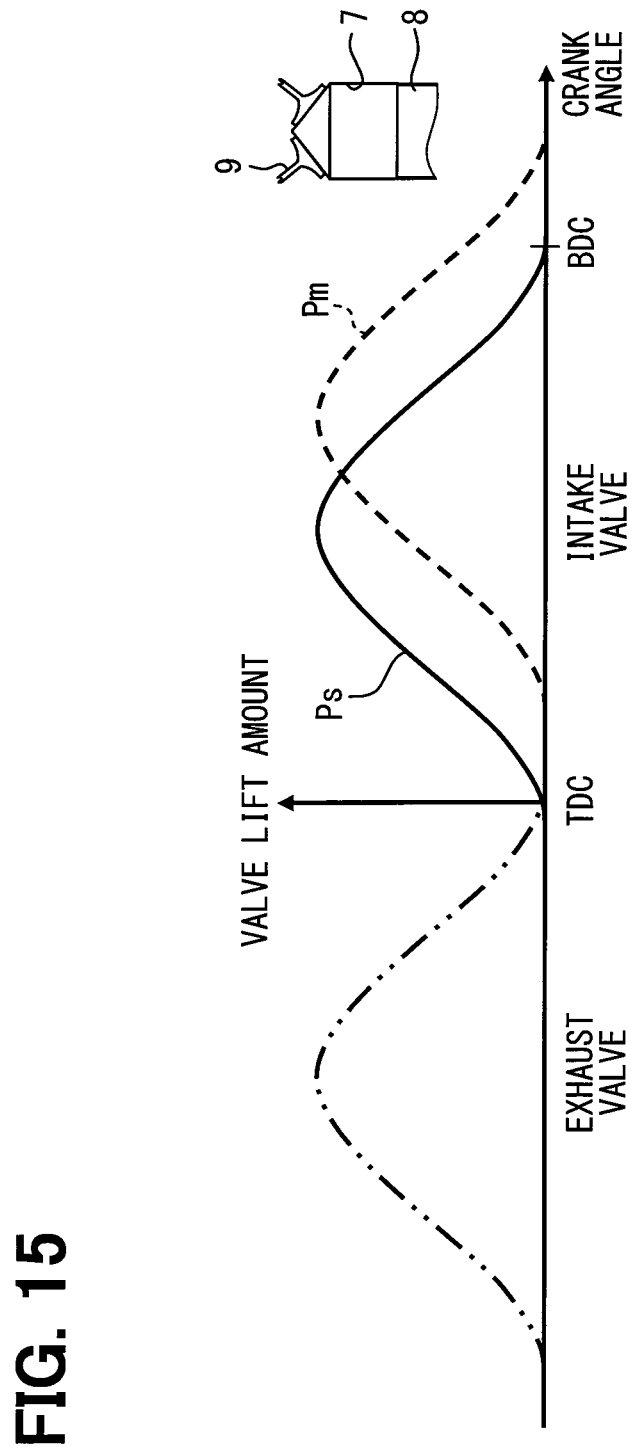
FIG. 15 is a characteristic diagram for explaining a feature of the valve timing control apparatus of FIG. 1.

Under this situation, the main lock phase Pm which is realized by the main lock component 160 entering the main lock hole 162 is set in advance at a most retard phase shown in FIGS. 2 and 14. In this embodiment, the main lock phase Pm is set in advance, as shown in FIG. 15, at a rotation phase for closing the intake valve 9 later than a timing at which the piston 8 in the cylinder 7 of the engine reaches the bottom dead center BDC.

A secondary lock mechanism 17 corresponding to a secondary lock member is described. As shown in FIGS. 3 and 4, the secondary lock mechanism 17 is defined by combining a secondary elastic component 173 and a restriction slot 174 with the group of the secondary lock elements 170, 171, 172.

Figure 6:
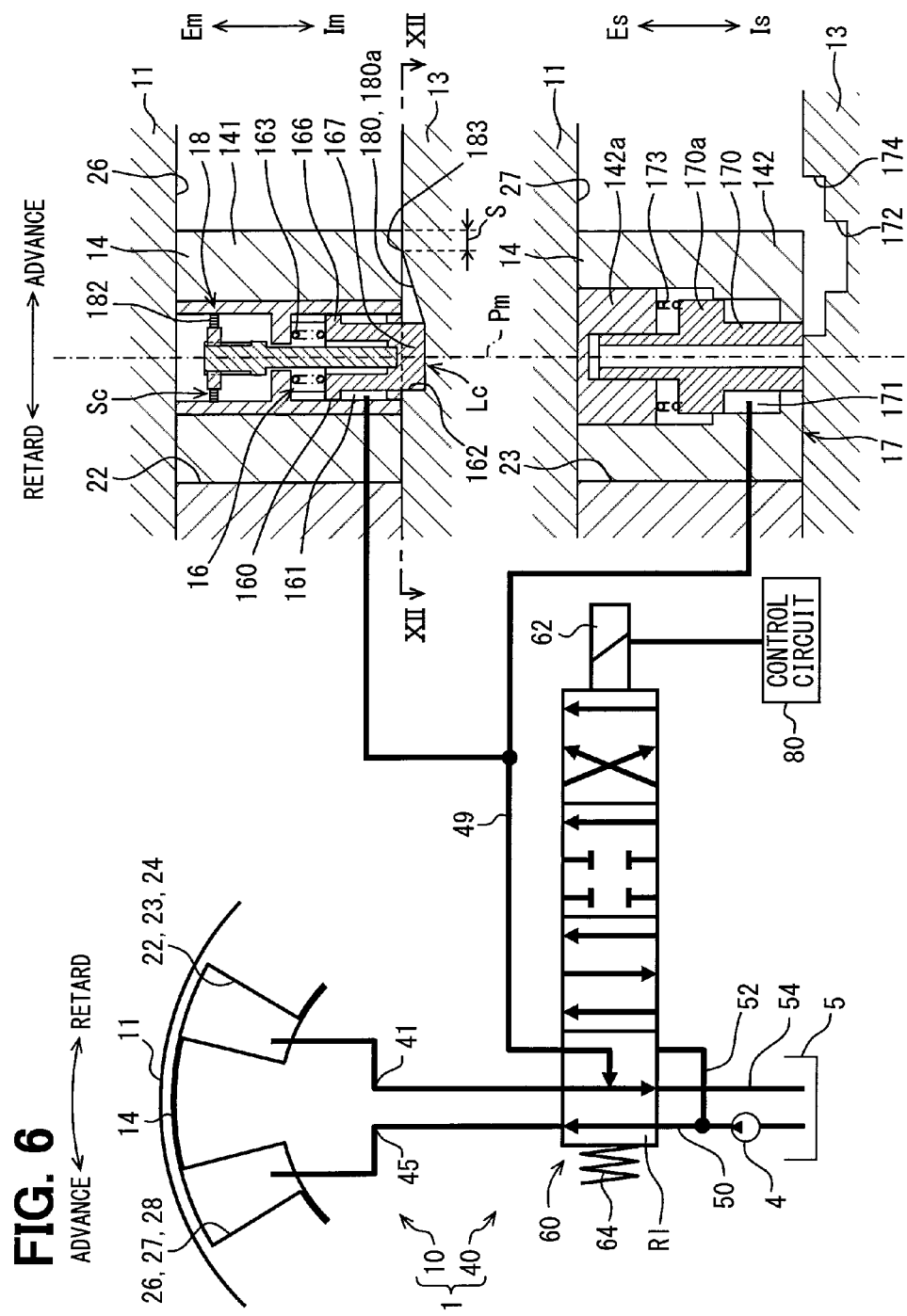
FIG. 6 is a diagram showing an operation state of the valve timing control apparatus of FIG. 1.

The secondary elastic component 173 is a metal coil spring, and is accommodated in the vane 142. As shown in FIG. 6, the secondary elastic component 173 is interposed between spring receivers 142a, 170a, respectively provided to the vane 142 and the secondary lock component 170, in the axial direction. The secondary elastic component 173 produces a restoring force to bias the secondary lock component 170 toward the rear plate 13. Therefore, at the secondary lock phase Ps shown in FIGS. 7 and 8, the secondary lock component 170 receives the restoring force of the secondary elastic component 173 in an entering direction Is, thus, the secondary lock component 170 is biased toward the secondary lock hole 172 in the entering direction Is. Moreover, due to the pressure from the secondary unlock chamber 171, the secondary lock component 170 receives the driving force in an escaping direction Es opposite from the entering direction Is, and is driven in the escaping direction Es against the restoring force of the secondary elastic component 173, as shown in FIG. 8.

As shown in FIGS. 2, 3, and 6, the restriction slot 174 is defined in the rear plate 13 with the based groove shape circularly extended along the rotational direction of the rotor 11, 14. The secondary lock hole 172 is further defined from the bottom of the restriction slot 174 with the based cylindrical shape at a halfway position of the restriction slot 174.

When the secondary lock component 170 having the cylindrical shape enters the restriction slot 174 not overlapping with the secondary lock hole 172, the rotation phase is restricted to a predetermined domain which includes the secondary lock phase Ps. Moreover, when the secondary lock component 170 enters the secondary lock hole 172 from the restriction slot 174, the rotation phase is locked at the secondary lock phase Ps of FIG. 7, because the rotation phase reaches the secondary lock phase Ps.

Under this situation, the secondary lock phase Ps realized by the secondary lock component 170 entering the secondary lock hole 172 is set in advance at the middle phase which is se on the advance side from the main lock phase Pm, as shown in FIGS. 3 and 14. In this embodiment, the secondary lock phase Ps is set in advance, as shown in FIG. 15, at a rotation phase for closing the intake valve 9 at just or adjacent timing at which the piston 8 in the cylinder 7 of the engine reaches the bottom dead center BDC.

A lock control mechanism 18 corresponding to a lock control member is described with reference to FIGS. 1, 9, and 10. The lock control mechanism 18 is defined by combining the guide slot 180 and the temperature sensing member 182, and controls the lock and unlock of the rotation phase by the main lock mechanism 16 and the secondary lock mechanism 17.

Figure 13:
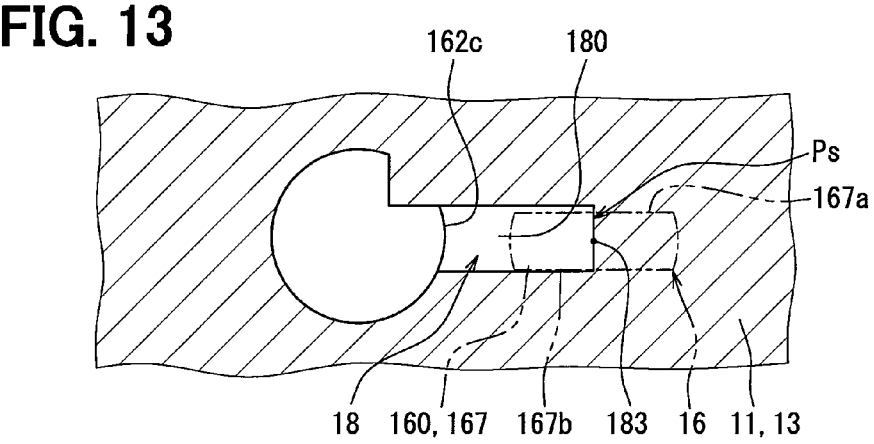
FIG. 13 is a cross-sectional view taken along a line XIII-XIII of FIG. 7.

As shown in FIGS. 2, 3, 9, and 12, the guide slot 180 is defined in the rear plate 13 with the based groove shape extended toward a predetermined permission point 183 from the main lock hole 162. As shown in FIGS. 7 and 13, the permission point 183 is a point corresponding to the secondary lock phase Ps at which the secondary lock component 170 is able to enter the secondary lock hole 172.

At the secondary lock phase Ps, as shown in FIG. 7, the secondary lock component 170 is at a point just corresponding to the main lock component 160 in the axial direction. As shown in FIG. 9, the base of the guide slot 180 defines a sloped surface 180a which is a plane extending in the escaping direction Em as extending from the main lock hole 162 to the permission point 183. Therefore, the depth of the guide slot 180 is set to gradually become shallow as going to the permission point 183 from the main lock hole 162.

As shown in FIG. 13, the guide slot 180 has a width which is larger than the width of the slide part 167 entering through the opening 162c, and extends with the linear (straight) shape. Therefore, the slide part 167 is able to slide in the guide slot 180 at the rotation phase from the main lock phase Pm shown in FIGS. 6, 9, and 12 to the secondary lock phase Ps shown in FIGS. 7 and 13, and is guided to the permission point 183 from the main lock hole 162.

Moreover, at this time, since the slide part 167 is biased by the main elastic component 163 in the entering direction Im, as shown in the double chain line of FIG. 9, the slide part 167 is pressed to the sloped surface 180a and receives a drag. Due to the drag, as the slide part 167 goes along the sloped surface 180a toward the permission point 183, the slide part 167 is pushed out in the escaping direction Em. As the result, in this embodiment, as shown in FIG. 7, when the slide part 167 reaches the permission point 183, the slide part 167 is completely outside the guide slot 180.

A sloped angle of the sloped surface 180a is set in advance in consideration of the coefficient of friction of the slide part 167 against the sloped surface 180a, the magnitude of the restoring force of the main elastic component 163, the magnitude of a negative torque at the time of starting, to be described later, when the temperature of the engine in the stopped state is low, and the seal length between the rotors 11 and 14 (that corresponds to the length S between the permission point 183 and the retard chamber 26 shown in FIGS. 5 and 6).

Figure 16:
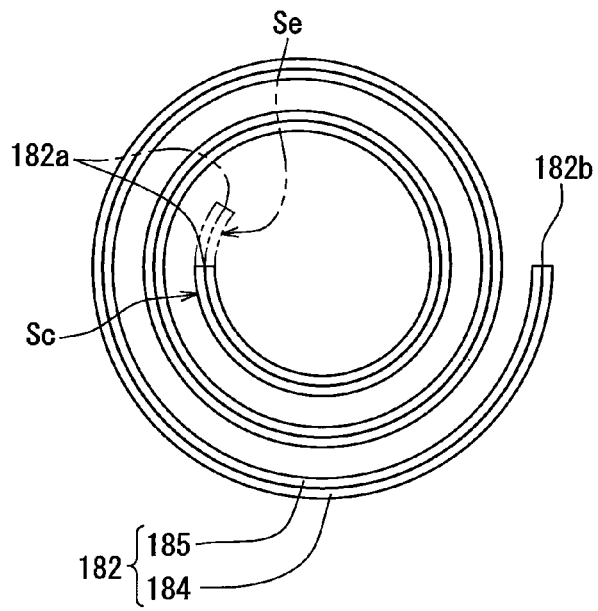
FIG. 16 is a plan view illustrating a temperature sensor of the valve timing control apparatus of FIG. 1.

As shown in FIG. 9, the temperature sensing member 182 is located between the inner flange part 144a and the front plate 15, in the support bush 144. As shown in FIGS. 9, 10, and 16, the temperature sensing member 182 is made of bimetal having a spiral shape in the same plane, and the center of the spiral shape is in agreement with the rotation center of the main lock component 160.

The maximum inner circumference part 182a of the temperature sensing member 182 is engaged with the main lock component 160 by being wound around the outer circumference part of the fitting ring 168. The maximum outer circumference part 182b of the temperature sensing member 182 is fixed and engaged with a projection part (not shown) of the inner circumference part of the support bush 144. The temperature sensing member 182 is able to drive the main lock component 160 to rotate by the displacement of the maximum inner circumference part 182a.

As shown in FIG. 16, the temperature sensing member 182 expands or shrinks based on the ambient temperature, and has a high expansion layer 184 and a low expansion layer 185.

The coefficient of thermal expansion is different between the high expansion layer 184 and the low expansion layer 185. The high expansion layer 184 has a coefficient of linear expansion higher than that of the low expansion layer 185, and is laminated on the outer circumference side of the low expansion layer 185. The high expansion layer 184 may be made of nickel-chromium-iron (Ni—Cr—Fe) base alloy material, for example, and the low expansion layer 185 may be made of nickel-iron (Ni—Fe) base alloy material.

The temperature sensing member 182 expands or shrinks according to the engine temperature (ambient temperature), and the main lock component 160 is rotated by the maximum inner circumference part 182a. Specifically, when the engine temperature is higher than or equal to a preset temperature Ts (see FIGS. 18 and 19), the temperature sensing member 182 is changed to an expanding state Se as shown in the double chain line of FIG. 16.

At the main lock phase Pm of FIG. 5 where the main lock component 160 is located in the main lock hole 162, the temperature sensing member 182 in the expanding state Se displaces the maximum inner circumference part 182a on a first side in the circumferential direction of the main lock hole 162. Thereby, the slide part 167 is driven to rotate to the prohibition position Lp of FIG. 11. Therefore, at this time, the main lock component 160 is prohibited from moving out of the main lock hole 162 toward the guide slot 180.

The temperature sensing member 182 is changed to the shrinking state Sc shown in a solid line of FIG. 16, when the engine temperature is lower than the preset temperature Ts. At the main lock phase Pm of FIG. 6 where the main lock component 160 is located in the main lock hole 162, the temperature sensing member 182 displaces the maximum inner circumference part 182a on a second side which is opposite from the first side in the circumferential direction of the main lock hole 162. Thereby, the slide part 167 is rotated to the allowance position Lc of FIG. 12. Therefore, the main lock component 160 is allowed to escape from the main lock hole 162 toward the guide slot 180.

In this embodiment, the preset temperature Ts set for the temperature sensing member 182 is defined to a temperature at which the slide part 167 is moved to the allowance position Lc from the prohibition position Lp. The preset temperature Ts is adjusted, for example, within a range of 40-60° C. by selecting the material for the layers 184, 185.

The variation torque applied from the camshaft 2 to the vane rotor 14 will be described.

Figure 17:
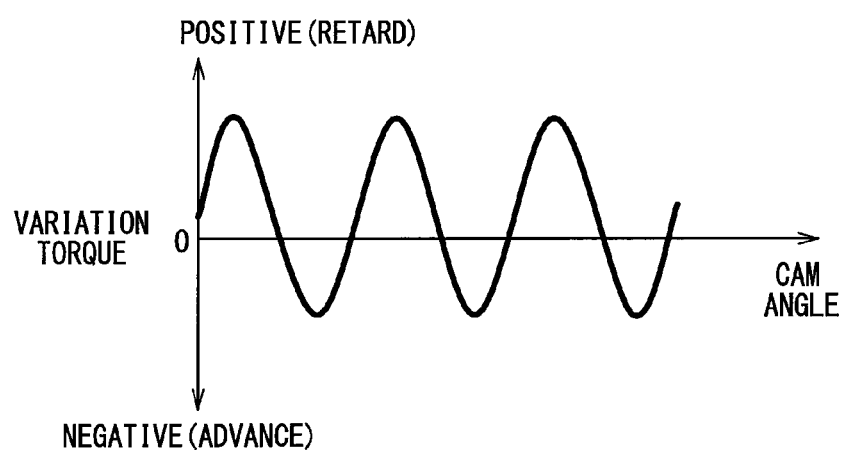
FIG. 17 is a graph for explaining a variation torque applied to the valve timing control apparatus of FIG. 1.

While the engine is rotated, the variation torque is applied to the vane rotor 14 by the spring reaction force from the intake valve 9 which is opened and closed by the camshaft 2. As shown in FIG. 17, the variation torque fluctuates between the negative torque applied on the advance side to the housing rotor 11 and the positive torque applied on the retard side to the housing rotor 11. The peak torque of the positive torque is larger than the peak torque of the negative torque, due to the friction between the camshaft 2 and the bearing, so the average torque is deviated on the positive torque (on the retard side).

A structure biasing the vane rotor 14 toward the secondary lock phase Ps is explained.

In the drive part 10 shown in FIG. 1, a first stopper pin 110 and a second stopper pin 146 are respectively provided to the rotors 11 and 14. The first stopper pin 110 has a pillar shape projected away from the shoe ring 12 in the axial direction from the front plate 15. The second stopper pin 146 has a pillar shape projected in the axial direction toward the front plate 15 from an arm plate 147 of the rotation shaft 140 approximately parallel to the front plate 15. The stopper pins 110, 146 are located at positions eccentric relative to the rotation central of the rotors 11, 14 by a substantially same distance, and are not overlap with each other in the axial direction.

The advance elastic component 19 is arranged between the front plate 15 and the arm plate 147. The advance elastic component 19 is made of metal plate material having a spiral shape in the same plane, and the center of the spiral shape is in agreement with the rotation center of the rotor 11, 14. The maximum inner circumference part of the advance elastic component 19 is wound around the outer circumference part of the rotation shaft 140. The maximum outer circumference part of the advance elastic component 19 is bent to have U-shape, and defines a locking part 190. The locking part 190 is able to be engaged with the corresponding pin 110, 146 corresponding to the rotation phase.

When the rotation phase is located between the lock phases Ps and Pm, that is on the retard side from the secondary lock phase Ps, the locking part 190 is engaged with the first stopper pin 110. At this time, since the second stopper pin 146 is separated from the locking part 190, the restoring force generated by the torsional elastic deformation of the advance elastic component 19 acts on the vane rotor 14 as an advance-side rotation torque relative to the housing rotor 11. That is, the vane rotor 14 is biased toward the secondary lock phase Ps on the advance side. The restoring force of the advance elastic component 19 between the lock phases Ps and Pm is set in advance so as to be larger than the average value of the variation torque (refer to FIG. 17) which is deviated on the retard side. On the other hand, when the rotation phase is changed to the advance side than the secondary lock phase Ps, the locking part 190 is engaged with the second stopper pin 146. At this time, since the first stopper pin 110 is separated from the locking part 190, the biasing action of the advance elastic component 19 to the vane rotor 14 is restricted.

Operations of the apparatus 1 are described.

Figure 18:
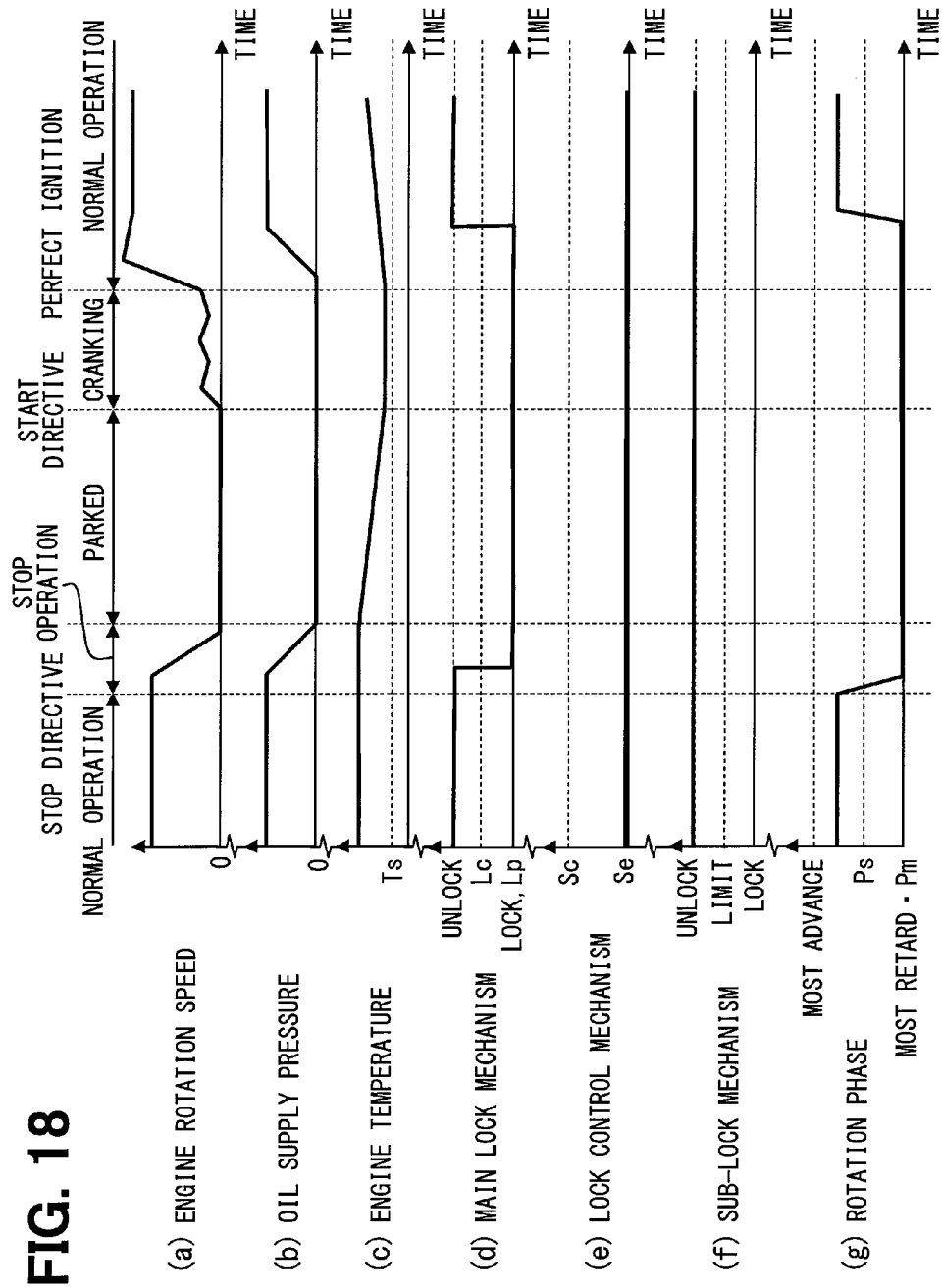
FIG. 18 is a time chart for explaining an operation example of the valve timing control apparatus of FIG. 1.
Figure 19:
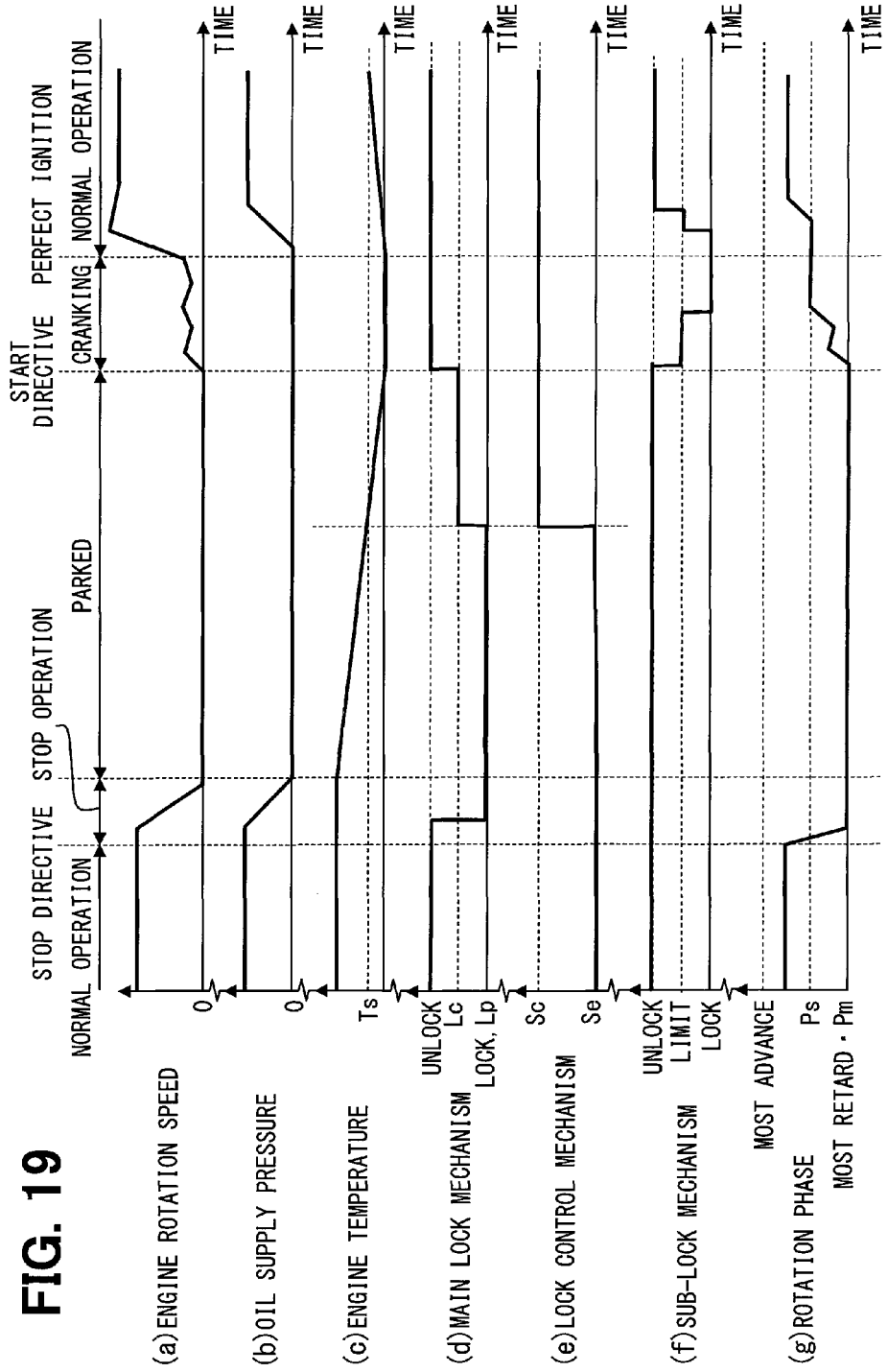
FIG. 19 is a time chart for explaining an operation example of the valve timing control apparatus of FIG. 1.

Normal operation is described. While the engine has normal operation after starting and perfecting ignition, the spool 68 is moved to either of the domains Rr, Ra, Rh. At this time, as shown in FIGS. 18 and 19, the supply of operation oil from the pump 4 is continued at the high pressure according to the revolving speed of the engine. As a result, the main lock component 160 moves out of the main lock hole 162 and the guide slot 180, due to the pressure of operation oil introduced into the main unlock chamber 161 against the restoring force of the main elastic component 163 (FIG. 8). Further, the secondary lock component 170 moves out of the secondary lock hole 172 and the restriction slot 174 due to the pressure of operation oil introduced into the secondary unlock chamber 171 against the restoring force of the secondary elastic component 173 (FIG. 8). Thus, while the rotation phase is maintained to be unlocked relative to the lock phase Pm, Ps, the valve timing is adjusted suitably by the movement of the spool 68 which is changed into either of the domains Rr, Ra, Rh.

Stop operation and start operation are described. As shown in FIGS. 18 and 19, the engine is switched from the normal operation to a stop operation according to a stop directive such as off-instruction from the engine switch SW or idling stop instruction from the idling stop system ISS. First, in this embodiment, the spool 68 is moved to the lock domain RI before the engine is changed into an inertia rotation state by fuel cut. At this time, the supply of operation oil from the pump 4 is continued at the high pressure according to the revolving speed of the engine. Therefore, the rotation phase is changed by the operation oil pressure in the retard chambers 26, 27, 28 to the main lock phase Pm which is the most (maximum) retard phase.

After the change to the main lock phase Pm, the engine is changed into an inertia rotation state, then, as shown in FIGS. 18 and 19, the supply pressure of the operation oil from the pump 4 will decrease gradually according to the speed of the inertia rotation. At this time, since the pressure in the main unlock chamber 161 is lowered, the main lock component 160 which receives the restoring force of the main elastic component 163 enters the main lock hole 162 at a rotation position in the circumferential direction (FIG. 5). Since the pressure of the secondary unlock chamber 171 is lowered, the secondary lock component 170 which receives the restoring force of the secondary elastic component 173 contacts the rear plate 13 outside of the secondary lock hole 172 and the restriction slot 174 (FIG. 5). As a result, the engine stops completely in the state where the rotation phase is locked at the main lock phase Pm.

While the engine is stopped, when the temperature of engine is higher than or equal to the preset temperature Ts, as shown in FIG. 18, the slide part 167 in the main lock hole 162 is driven to rotate to the prohibition position Lp by the temperature sensing member 182 in the expanding state Se (FIG. 11). As a result, the main lock component 160 receives the restoring force of the main elastic component 163 in the state where the pressure in the main unlock chamber 161 is lowered, and the slide part 167 is fitted to the main lock hole 162, such that the slide part 167 is prohibited from moving out of the guide slot 180 (FIGS. 5 and 11). The secondary lock component 170 which receives the restoring force of the secondary elastic component 173 in the state where the pressure in the secondary unlock chamber 171 is lowered contacts the rear plate 13 outside of the secondary lock hole 172 and the restriction slot 174 (FIG. 5). As a result, the rotation phase is maintained to be locked at the main lock phase Pm.

Thereafter, in response to a start directive such as on-instruction from the engine switch SW or re-starting instruction from the idling stop system ISS, the cranking of the engine is started when the temperature of the engine is higher than or equal to the preset temperature Ts, as shown in FIG. 18, and the temperature sensing member 182 continues in the expanding state Se. At this time, the position of the spool 68 is held to the lock domain RI, and the supply of operation oil from the pump 4 is substantially stopped. Therefore, the main lock component 160 which receives the restoring force of the main elastic component 163 in the state where the pressure of the main unlock chamber 161 is lowered, and the slide part 167 at the prohibition position Lp in the main lock hole 162 is kept in the prohibited state prohibited from moving out of the guide slot 180 (FIG. 11). The secondary lock component 170 which receives the restoring force of the secondary elastic component 173 in the state where the pressure in the secondary unlock chamber 171 is lowered contacts the rear plate 13 outside of the secondary lock hole 172 and the restriction slot 174 (FIG. 5). As a result, as shown in FIG. 18, the engine perfects the ignition in the state where the rotation phase is locked at the main lock phase Pm.

While the engine is stopped, when the temperature of the engine is lower than the preset temperature Ts, as shown in FIG. 19, the slide part 167 in the main lock hole 162 is driven to rotate to the allowance position Lc by the temperature sensing member 182 which is changed to the shrinking state Sc (FIG. 12). As a result, the main lock component 160 which receives the restoring force of the main elastic component 163 in the state where the pressure in the unlock chamber 161 is lowered, the slide part 167 in the main lock hole 162 is changed from the prohibition state to the allowance state relative to the guide slot 180 (FIGS. 6 and 12). The secondary lock component 170 which receives the restoring force of the secondary elastic component 173 in the state where the pressure in the secondary unlock chamber 171 lowered contacts the rear plate 13 outside of the secondary lock hole 172 and the restriction slot 174 (FIG. 6). As a result, the rotation phase is unlocked from the lock phase Pm, Ps.

Thereafter, in response to a start directive such as on-instruction from the engine switch SW or re-starting instruction from the idling stop system ISS, when the cranking of the engine is started while the temperature of the engine is lower than the preset temperature Ts, as shown in FIG. 19, the temperature sensing member 182 continues in the shrinking state Sc. At this time, the position of the spool 68 is held to the lock domain RI, and the supply of operation oil from the pump 4 is substantially stopped. Therefore, the main lock component 160 which receives the restoring force of the main elastic component 163 in the state where the pressure in the main unlock chamber 161 is lowered, the slide part 167 at the allowance position Lc in the main lock hole 162 is maintained to be allowed to move out of the guide slot 180 (FIGS. 6 and 12). The secondary lock component 170 which receives the restoring force of the secondary elastic component 173 in the state where the pressure in the secondary unlock chamber 171 is lowered contacts the rear plate 13 outside of the secondary lock hole 172 and the restriction slot 174 (FIG. 6).

Thus, when the engine is started under the situation where the temperature of the engine is low and the rotation phase is unlocked from the lock phase Pm, Ps, the vane rotor 14 is rotated on the advance side relative to the housing rotor 11 by the action of negative torque. At this time, the main lock component 160 supported by the vane rotor 14, the slide part 167 is moved from the allowance position Lc into the guide slot 180 through the opening 162c by the action of negative torque, and is further guided toward the permission point 183 inside the slot 180 (double chain line of FIG. 9). As a result, when the rotation phase is advanced from the main lock phase Pm, the secondary lock component 170 which receives the restoring force of the secondary elastic component 173 in the state where the pressure in the secondary unlock chamber 171 is lowered is allowed to enter the restriction slot 174. Therefore, when the vane rotor 14 to which the positive torque is applied is rotated on the retard side relative to the housing rotor 11, the rotation phase is restricted from returning to the main lock phase Pm, as shown in FIG. 19.

Then, when the rotation phase is further advanced by the action of negative torque to the secondary lock phase Ps, the secondary lock component 170 which receives the restoring force of the secondary elastic component 173 in the state where the pressure in the secondary unlock chamber 171 is reduced is allowed to enter the secondary lock hole 172 (FIG. 7). At this time, the slide part 167 is pushed out in the escaping direction Em by the drag action from the sloped surface 180a, in the main lock component 160 which receives the restoring force of the main elastic component 163 in the state where the pressure in the main unlock chamber 161 is lowered (FIGS. 7 and 13). As a result, the secondary lock component 170 is fitted to the secondary lock hole 172, and the slide part 167 contacts the rear plate 13 outside of the main lock hole 162 and the guide slot 180. Therefore, as shown in FIG. 19, the engine perfects the ignition in the state where the rotation phase is changed to be locked at the secondary lock phase Ps.

Advantage of the embodiment is explained below.

At the main lock phase Pm, while the engine is stopped with temperature higher than or equal to the preset temperature Ts, the main lock component 160 is prohibited from moving out of the main lock hole 162 to the guide slot 180 by expansion of the temperature sensing member 182. As a result, the rotation phase is locked at the main lock phase Pm, while the main lock component 160 maintains to stay in the main lock hole 162. At the main lock phase Pm, the intake valve 9 is closed late timing later than a timing at which the piston 8 in the cylinder 7 reaches the bottom dead center BDC.

At the next time starting the engine, the gas in the cylinder 7 is pushed out to the intake system according to the lift-up of the piston 8 after reaching the bottom dead center, and a real compression ratio is lowered as a decompression effect. Therefore, when the engine is frequently and repeatedly re-started by the idol stop system ISS, for example, under the temperature of the engine is high, the rotation phase maintains to be locked at the main lock phase Pm, and the starting fault can be controlled.

On the other hand, at the main lock phase Pm, while the engine is stopped with temperature lower than the preset temperature Ts, the rotation phase is unlocked by the shrinking of the temperature sensing member 182, so the main lock component 160 is able to move out of the main lock hole 162. Therefore, at the next time starting the engine, the main lock component 160 is allowed to move out of the main lock hole 162 into the guide slot 180, due to the variation torque applied from the camshaft 2, and is guided toward the permission point 183, and the vane rotor 14 is relatively rotated to the advance side relative to the housing rotor 11. As a result, when the rotation phase is changed to the secondary lock phase Ps that is located on the advance side than the main lock phase Pm, the secondary lock component 170 is allowed to enter the secondary lock hole 172, and the rotation phase is locked at the secondary lock phase Ps. Thus, the timing closing the intake valve 9 becomes early as much as possible. Thereby, the push-out amount of the gas in the cylinder 7 decreases, and the temperature of the gas rises with the real compression ratio. Accordingly, when the engine is restarted in the situation where the temperature of the engine is low, for example, when the vehicle is started after long time while the vehicle is parked in the very low temperature environment, or when the engine is restarted after the vehicle is stopped by the idol stop system ISS as a temporary halt, the startability can be secured by raising the ignitionability.

Accordingly, it becomes possible to start the engine suitably for the temperature of the engine.

At the main lock phase Pm while the engine is stopped with the temperature higher than or equal to the preset temperature, the main lock component 160 is rotated to the prohibition position Lp in the circumferential direction of the main lock hole 162 by the temperature sensing member 182 in the expanding state Se, and is prohibited from moving out of the guide slot 180. In this way, when the rotation phase is located at the main lock phase Pm while the engine is started with the temperature higher than or equal to the preset temperature, the rotation phase is maintained at the main lock phase Pm, and the starting fault may be controlled.

Moreover, at the main lock phase Pm while the engine is stopped with the temperature lower than the preset temperature, the main lock component 160 is rotated to the allowance position Lc in the circumferential direction of the main lock hole 162, and is allowed to move out of the main lock phase Pm to the guide slot 180, due to the temperature sensing member 182 in the shrinking state Sc. In this way, when the rotation phase is unlocked from the main lock phase Pm while the engine is started with the temperature lower than the preset temperature, the rotation phase is changed to the secondary lock phase Ps by the variation torque, and the startability may be secured.

Accordingly, the expanding or shrinking of the temperature sensing member 182 according to the engine temperature and the rotation of the main lock component 160 can accurately control the rotation phase suitably based on the engine temperature when the engine is started.

Moreover, the slide part 167 entering the main lock hole 162 at the main lock phase Pm while the engine is stopped with the temperature higher than or equal to the preset temperature is driven to rotate to the prohibition position Lp by the temperature sensing member 182 in the expanding state Se. Thereby, a gap is produced in the circumferential direction relative to the opening 162c of the guide slot 180 which is located at a specific part in the circumferential direction. According to this, the slide part 167 is certainly forbidden from escaping from the main lock hole 162 through the opening 162c, and the rotation phase maintains to be locked at the main lock phase Pm.

On the other hand, the slide part 167 entering the main lock hole 162 at the main lock phase Pm while the engine is stopped with the temperature lower than the preset temperature is rotated to the allowance position Lc by the temperature sensing member 182 in the shrinking state Sc, and becomes able to enter the opening 162c of the guide slot 180. According to this, the slide part 167 is certainly allowed to enter the opening 162c from the main lock hole 162, and the rotation phase is unlocked from the main lock phase Pm.

Further, when the rotation phase changes to the secondary lock phase Ps in the state where the engine is stopped with the temperature lower than the preset temperature, the slide part 167 slides in the guide slot 180. Therefore, the main lock component 160 is surely guided to the permission point 183, and the secondary lock component 170 can enter the secondary lock hole 172. Accordingly, the rotation phase is locked or unlocked suitably based on the engine temperature, and it becomes possible to improve reliability about the change in the rotation phase suitably based on the engine temperature when the engine is started.

Furthermore, the temperature sensing member 182 having the spiral shape expands or shrinks at the main lock phase Pm, thereby displacing the maximum inner circumference part 182a in the circumferential direction of the main lock hole 162. Thereby, the main lock component 160 engaged with the maximum inner circumference part 182a is surely rotated between the prohibition position Lp and the allowance position Lc. Because the main lock component 160 is rotated to lock or unlock the rotation phase according to the engine temperature, it becomes possible to improve reliability about the change in the rotation phase suitably based on the engine temperature when the engine is started.

Furthermore, while the engine is started with the low temperature, the main lock component 160 is guided by the guide slot 180 from the main lock hole 162 to the permission point 183 in response to the change in the rotation phase. At this time, the main lock component 160 receives the biasing force from the main elastic component 163 in the entering direction Im toward the main lock hole 162 or the guide slot 180. Therefore, the main lock component 160 which receives the biasing force from the main elastic component 163 is pressed to the sloped surface 180a of the guide slot 180 which is inclined to the escaping direction Em opposite from the entering direction Im as extending from the main lock hole 162 to the permission point 183. As a result, the main lock component 160 receives the drag from the sloped surface 180a while going to the permission point 183, thereby being able to be pushed out from the guide slot 180 in the escaping direction Em opposite from the entering direction Im against the biasing force of the main elastic component 163. According to this, the main lock component 160 is moved out of the guide slot 180, and the flexible valve timing adjustment can be achieved by subsequent change in the rotation phase.

In addition, in the rotation phase between the main lock phase Pm and the secondary lock phase Ps, the vane rotor 14 is biased by the advance elastic component 19 to the advance side relative to the housing rotor 11. Therefore, when the engine is started with low temperature, the rotation phase of the vane rotor 14 relative to the housing rotor 11 can be quickly changed to the secondary lock phase Ps, due to the advance elastic component 19 and the variation torque. Thus, the time period taken to lock the rotation phase at the secondary lock phase Ps from the start of cranking which generates the variation torque in the engine at the time of starting the engine with low temperature can be shortened. It becomes possible to improve reliability of the startability especially when the engine is started with the low temperature.

MODIFICATIONS

The present disclosure is not limited to the above embodiment.

Figure 20:
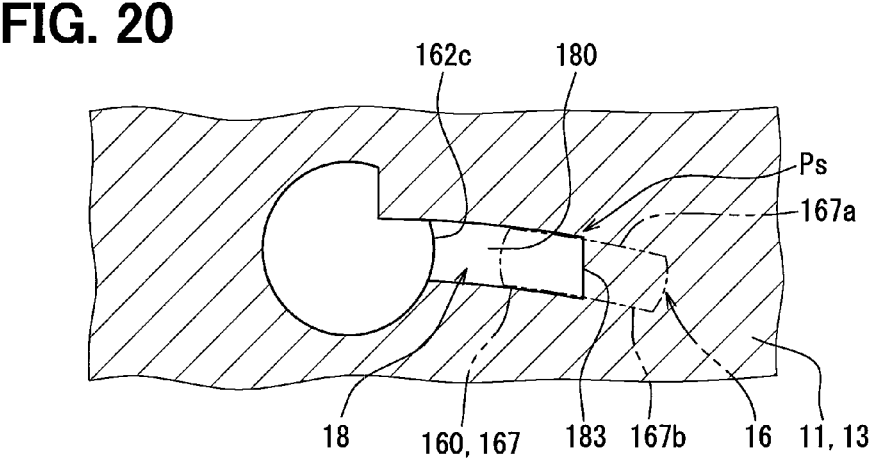
FIG. 20 is a modification example of FIG. 13.

As a first modification, as shown in FIG. 20, the guide slot 180 may be extended with the curved shape along the rotational direction of the rotors 11 and 14, and the long surface 167a, 167b of the slide part 167 may have the curved shape corresponding to the curved shape of the guide slot 180.

Figure 21:
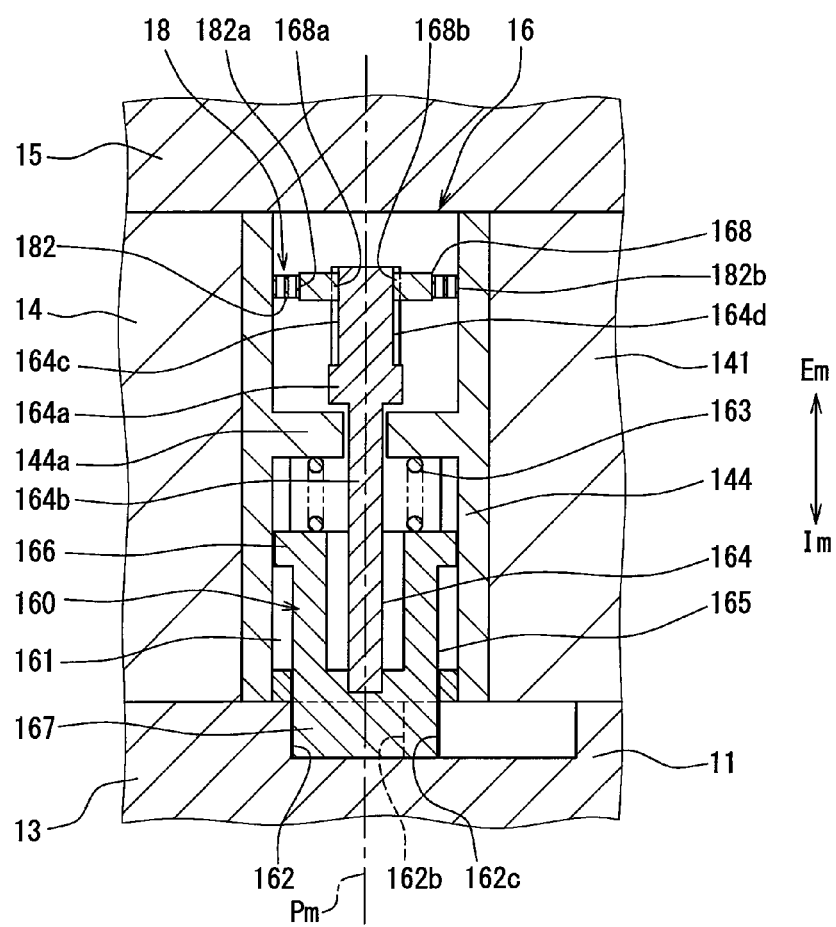
FIG. 21 is a modification example of FIG. 9.

As a second modification, as shown in FIG. 21, the guide slot 180 may not have the sloped surface 180a. The main lock component 160 may leave the slot 180 only according to the operation oil pressure in the main unlock chamber 161.

As a third modification, as shown in FIG. 22, the main lock component 160 may leave the guide slot 180 only by the drag from the sloped surface 180a without forming the main unlock chamber 161.

As a fourth modification, the both ends of the temperature sensing member 182 having the spiral shape may be fitted to the main lock component 160 (fitting ring 168) and the vane rotor 14 (support bush 144), respectively.

As a fifth modification, the temperature sensing member 182 and the lock component 160, 170 may be supported by the housing rotor 11 support, and the slot 180, 174 and the lock hole 162, 172 may be defined in the vane rotor 14.

As a sixth modification, the elastic component 163, 173 may be made of metal spring other than the coil spring or rubber.

As a seventh modification, the pump 4 may be electric pump which can start supplying operation oil in connection with the complete ignition in the engine or arbitrary timing.

As an eighth modification, the main lock phase Pm may be set on the advance side than the maximum retard phase, if the intake valve 9 is closed later timing later than the timing at which the piston 8 in the cylinder 7 reaches the bottom dead center BDC.

As a ninth modification, the secondary lock phase Ps may be set at a rotation phase where the intake valve 9 is closed at early timing as much as possible than the timing at which the piston 8 in the cylinder 7 reaches the bottom dead center BDC.

As a tenth modification, it may not be necessary to form the advance elastic component 19. In this case, the movement of the spool 68 to the lock domain Rl and the inertia rotation of the engine are performed in opposite order.

As an eleventh modification, when the engine stops according to off instruction from the switch SW, the rotation phase may be locked at the secondary lock phase Ps. Thereafter, when the engine starts according to on instruction from the switch SW, the lock at the phase Ps may be realized as it is.

As a twelfth modification, when the engine stops according to idol stop instruction from the system ISS, the rotation phase may be locked at the secondary lock phase Ps. Thereafter, when the engine starts according to re-starting instruction from the system ISS, the lock at the phase Ps may be realized as it is.

Such changes and modifications are to be understood as being within the scope of the present disclosure as defined by the appended claims.

What is claimed is:

1. A valve timing control apparatus which controls a valve timing of an intake valve opening and closing a cylinder of an internal combustion engine by a pressure of hydraulic fluid, the valve timing control apparatus comprising:
    a housing rotor which is rotated with a crankshaft of the internal combustion engine;
    a vane rotor which is rotated with a camshaft of the internal combustion engine, the vane rotor receiving the pressure of hydraulic fluid in the housing rotor such that a rotation phase of the vane rotor relative to the housing rotor is changed;
    a main lock member having a main lock component and a main lock hole which are engaged with each other to lock the rotation phase at a main lock phase for closing the intake valve later than a timing at which a piston in the cylinder reaches a bottom dead center;
    a secondary lock member having a secondary lock component and a secondary lock hole which are engaged with each other to lock the rotation phase at a secondary lock phase which is set on an advance side than the main lock phase; and
    a lock controller which controls lock and unlock of the rotation phase by controlling the main lock member and the secondary lock member, wherein the lock controller has
        a guide slot which guides the main lock component from the main lock hole toward a permission point at which the secondary lock component is allowed to enter the secondary lock hole at the secondary lock phase, and
        a temperature sensing member which expands at the main lock phase when a temperature of the engine is higher than or equal to a predetermined temperature so as to prohibit the main lock component from moving out of the main lock hole toward the guide slot, wherein
        the temperature sensing member shrinks at the main lock phase when the temperature of the engine is lower than the predetermined temperature so as to allow the main lock component to move out of the main lock hole toward the guide slot.

2. The valve timing control apparatus according to claim 1, wherein
    the main lock component is able to rotate in a circumferential direction of the main lock hole between a prohibition position where the main lock component is prohibited from moving out at the main lock phase and an allowance position where the main lock component is allowed to move out at the main lock phase, and
    the temperature sensing member is changed based on the temperature of the engine between an expanding state in which the main lock component is driven to rotate to the prohibition position and a shrinking state in which the main lock component is driven to rotate to the allowance position.

3. The valve timing control apparatus according to claim 2, wherein
    the guide slot is defined at a predetermined position of the main lock hole in the circumferential direction,
    the main lock component has a slide part which rotatably enters the main lock hole at the main lock phase and which slides into the guide slot at the rotation phase from the main lock phase to the secondary lock phase,
    the prohibition position is a rotation position where the slide part is deviated from an opening of the main lock hole corresponding to the guide slot in the circumferential direction of the main lock hole, and
    the allowance position is a rotation position where the slide part is able to enter the opening of the main lock hole corresponding to the guide slot.

4. The valve timing control apparatus according to claim 2, wherein
    the temperature sensing member has a spiral shape, and a maximum inner circumference part of the spiral shape is engaged with the main lock component, and
    the maximum inner circumference part is displaced in the circumferential direction of the main lock hole by the expanding and the shrinking at the main lock phase.

5. The valve timing control apparatus according to claim 1, wherein
    the main lock member has a main elastic component which biases the main lock component toward the main lock hole or the guide slot in an entering direction at the rotation phase from the main lock phase to the secondary lock phase, and
    the guide slot defines a sloped surface which is inclined in an opposite direction opposite from the entering direction as going toward the permission point from the main lock hole.

6. The valve timing control apparatus according to claim 1, further comprising:
    an advance elastic component which biases the vane rotor on the advance side relative to the housing rotor at the rotation phase between the main lock phase and the secondary lock phase.

* * * * *